United States Patent
Zingale et al.

(10) Patent No.: US 8,230,363 B2
(45) Date of Patent: Jul. 24, 2012

(54) MANAGEMENT OF CORPORATE ENTITIES

(75) Inventors: Thomas B. Zingale, Pomona, NY (US); Stacy Lyons, Brooklyn, NY (US); James B. McHugh, Maplewood, NJ (US); Jean Boulet, Brooklyn, NY (US)

(73) Assignee: Goldman, Sachs & Co., New York, NY (US)

( * ) Notice: Subject to any disclaimer, the term of this patent is extended or adjusted under 35 U.S.C. 154(b) by 851 days.

(21) Appl. No.: 10/635,252

(22) Filed: Aug. 6, 2003

(65) Prior Publication Data

US 2004/0066409 A1 Apr. 8, 2004

Related U.S. Application Data

(60) Provisional application No. 60/401,285, filed on Aug. 6, 2002.

(51) Int. Cl.
*G06F 3/048* (2006.01)
*G06F 3/01* (2006.01)

(52) U.S. Cl. ........ 715/853; 715/205; 715/206; 715/764; 715/790; 715/810; 715/817; 715/854; 715/855

(58) Field of Classification Search .................. 715/764, 715/790, 530–531, 501, 205, 206, 810, 817, 715/818, 853, 854, 855; 705/26–27, 67, 501.1, 100

See application file for complete search history.

(56) References Cited

U.S. PATENT DOCUMENTS

| | | | | |
|---|---|---|---|---|
| 6,067,528 A * | 5/2000 | Breed et al. | ..................... | 705/26 |
| 6,307,573 B1 * | 10/2001 | Barros | .......................... | 715/764 |
| 6,499,026 B1 * | 12/2002 | Smith et al. | ....................... | 707/2 |
| 6,735,593 B1 * | 5/2004 | Williams | ...................... | 707/102 |
| 6,782,415 B1 * | 8/2004 | Quine | ............................ | 709/206 |
| 2001/0047284 A1 * | 11/2001 | Blalock et al. | .................... | 705/8 |
| 2002/0019810 A1 * | 2/2002 | Kumar et al. | .................... | 705/42 |
| 2002/0077946 A1 * | 6/2002 | Caplan et al. | ................... | 705/36 |
| 2002/0107746 A1 * | 8/2002 | Jacoby, Jr. | ....................... | 705/26 |
| 2003/0103090 A1 * | 6/2003 | Kelley et al. | .................... | 345/854 |
| 2004/0066409 A1 * | 4/2004 | Zingale et al. | ................. | 345/764 |
| 2005/0144116 A1 * | 6/2005 | Jacoby | ............................ | 705/37 |

* cited by examiner

*Primary Examiner* — Nicholas Augustine
(74) *Attorney, Agent, or Firm* — Perkins Coie LLP

(57) ABSTRACT

Systems and methods are provided to facilitate corporate entity management. According to some embodiments, a user interface is provided including an entity selection area allowing selection of at least one corporate entity from a plurality of corporate entities, and a plurality of selectable elements, each of the selectable elements being selectable to cause presentation of an associated area, wherein an area associated with each of the plurality of selectable elements presents information relating to the at least one corporate entity and to the associated selectable element.

24 Claims, 30 Drawing Sheets

| ENTITY ID 601 | UPSTREAM ENTITIES 602 | DOWNSTREAM ENTITIES 603 |
|---|---|---|
| E017 | E163, E501 | E175, E394 |
| E163 | NONE | E017 |
| E175 | E017 | NONE |
| E394 | E017 | NONE |
| E501 | NONE | E017 |

| ENTITY ID 601 | NAME 602 | TYPE 603 | STATUS 604 | DOMICILE 605 | TAXPAYER ID 606 | FORMED 607 | DISSOLVED 608 |
|---|---|---|---|---|---|---|---|
| E017 | HELD COMPANY | INC. | ACTIVE | DELAWARE | 13-7960643 | 3/4/1997 | --- |
| E163 | HOLDING COMPANY | LLC | ACTIVE | DELAWARE | 10-9437566 | 1/1/1994 | --- |
| E175 | HOLDING TRUST | LTD | ACTIVE | CAYMAN IS. | 13-8035830 | 3/4/1997 | --- |
| E394 | ABC FUND | L.P. | INACTIVE | MADRID | 13-8246721 | 3/4/1997 | 5/3/2000 |
| E501 | MY CORP | LLC | ACTIVE | CAYMAN IS. | 11-1101173 | 2/3/1998 | --- |

FIG. 6

| ENTITY ID 701 | ORIGINAL MINUTE BOOK 702 | DUPLICATE MINUTE BOOK 703 | CORPORATE SEAL 704 | STOCK CERTIFICATE 705 | DIRECTORS 706 | QUORUM 707 |
|---|---|---|---|---|---|---|
| E017 | NY LEGAL | NY LEGAL | NY LEGAL | NY LEGAL | 12 | 8 |
| E163 | UNKNOWN | DELAWARE CORPORATE | DELAWARE CORPORATE | NONE | 8 | 6 |
| E175 | NY LEGAL | CAYMAN LEGAL | CAYMAN LEGAL | CAYMAN LEGAL | 10 | 6 |
| E394 | NY LEGAL | MADRID LEGAL | MADRID LEGAL | NONE | 10 | 7 |
| E501 | UNKNOWN | UNKNOWN | UNKNOWN | NONE | 12 | 9 |

| ENTITY ID 801 | CONTACT 802 | TITLE 803 | START DATE 804 | END DATE 805 | CONTACT INFORMATION 806 |
|---|---|---|---|---|---|
| E017 | J. SMITH | PRIMARY ATTORNEY | 12/12/2000 | --- | --- |
| E017 | P. DAVIS | SECONDARY TAX CONTACT | 10/7/2001 | 3/4/2002 | 212-766-4301 P.DAVIS@HOLD_COMPANY.COM |
| E017 | J. DOE | CONTROLLER CONTACT | 12/12/2000 | --- | 111 ELM STREET STAMFORD, CT 06950 |
| E175 | S. TODD | PRIMARY ATTORNEY | 8/4/1998 | --- | 609-849-3344 |
| E175 | J. HOPE | AUTHORIZED SIGNATORY | 8/4/1998 | --- | J.HOPE@HOLDING_TRUST.COM |

FIG. 8

| ENTITY ID 901 | OWNER ID 902 | TYPE 903 | START DATE 904 | END DATE 905 | PERCENT HOLDING 906 |
|---|---|---|---|---|---|
| E017 | E163 | CLASS A | 3/4/97 | --- | 75% |
| E017 | E501 | CLASS B | 2/3/98 | --- | 25% |
| E175 | E017 | CLASS A | 6/8/98 | --- | 100% |
| E394 | E017 | CLASS A | 3/4/97 | 5/3/00 | 100% |

| ENTITY ID 1001 | REGULATOR 1002 | COUNTRY/REGION 1003 |
|---|---|---|
| E017 | BANK OF DELAWARE | U.S.A. |
| E017 | SECURITIES AND EXCHANGE COMMISSION | U.S.A. |
| E017 | CARIBBEAN EXCHANGE COMMISSION | CARIBBEAN |

| ENTITY ID 1101 | NAME 1102 | TITLE 1103 | SIGNATORY POWER 1104 |
|---|---|---|---|
| E017 | J. SMITH | DIRECTOR | ALL |
| E017 | J. JONES | DIRECTOR | ALL |
| E017 | H. WHITE | TREASURER | FINANCIAL DOCUMENTS |
| E017 | P. BLACK | ALTERNATE DIRECTOR | ALL, IF DIRECTORS CANNOT BE REACHED |
| E017 | R. GREEN | EXECUTIVE COMMITTEE MEMBER | NONE |
| E017 | T. STREET | ASSISTANT SECRETARY | NONE |

FIG. 11

| ENTITY ID 1201 | QUALIFIED 1202 | TYPE 1203 | REPORTING 1204 | JURISDICTION ID 1205 | QUALIFY DATE 1206 | EXPIRE DATE 1207 |
|---|---|---|---|---|---|---|
| E017 | DELAWARE | MAIN OFFICE | YES | D34-9378 | 3/4/1997 | 3/4/2003 |
| E017 | HONG KONG | BRANCH OFFICE | NO | HK-93421 | 5/5/1999 | -- |
| E163 | DELAWARE | BRANCH OFFICE | YES | D27-4110 | 1/1/1994 | 1/1/2003 |
| E175 | CAYMAN ISLANDS | BRANCH OFFICE | NO | C113-378 | 3/4/1997 | -- |
| E501 | CAYMAN ISLANDS | MAIN OFFICE | NO | C184-492 | 2/3/1998 | -- |
| E501 | HONG KONG | BRANCH OFFICE | NO | HK-93758 | 2/5/1998 | -- |

| ENTITY ID 1301 | REPORT 1302 | DOMICILE/ JURISDICTION 1303 | DUE 1304 | SENT 1305 |
|---|---|---|---|---|
| E017 | TAX NOTICE | DELAWARE | 4/15/2002 | 3/10/2002 |
| E017 | COMPLIANCE VERIFICATION | DELAWARE | 12/31/2002 | --- |

| ENTITY ID 1401 | CONSOLIDATION TYPE 1402 | CONTROLLERS ENTITY TYPE 1403 | SAO ID 1404 | SAO CONTACT INFORMATION 1405 | SCRP AUTOMATED? 1406 |
|---|---|---|---|---|---|
| E017 | CONSOLIDATED | NONE | ACS | 44(20)7992-3008 ANGELA.SALTER @GS.COM | YES |
| E163 | NOT CONSOLIDATED | NONE | JFD | 44(20)4737-8448 JORDAN.DACHS @GS.COM | YES |
| E501 | CONSOLIDATED | LLP | JLH | 44(20)7242-3123 JEAN.HERRING@ GS.COM | NO |

FIG. 14

| ENTITY ID 1501 | TRUSTEE 1502 | BOARD NOTICE 1503 | BOARD QUORUM 1504 | ANNUALS DUE 1505 |
|---|---|---|---|---|
| E163 | NOT SPECIFIED | NONE | 3 | NOT SPECIFIED |
| E017 | WILLIAM BROWN | 14 DAYS | 3 | 12/31 |
| E501 | CATHERINE GREEN | 7 DAYS | 5 | NOT SPECIFIED |

| DOCUMENT ID 1601 | DOCUMENT NAME 1602 | DOCUMENT TEMPLATE 1603 |
|---|---|---|
| D011 | SIGNATORY TEXT BLOCK | //DOCUMENTS/SIGNATORY_BLOCK.TMP |
| D017 | PROPERTY AGREEMENT | //DOCUMENTS/PROPERTY.TMP |
| D018 | JOINT DEVELOPMENT AGREEMENT | //DOCUMENTS/JOINT_DEV.TMP |
| D073 | NON-DISCLOSURE AGREEMENT | //DOCUMENTS/NON_DISCLOSURE.TMP |
| D105 | CONFIDENTIALITY AGREEMENT | //DOCUMENTS/CONFIDENTIALITY.TMP |

MANAGEMENT OF CORPORATE ENTITIES

CROSS REFERENCE TO RELATED APPLICATIONS

This application claims priority to Provisional Application Ser. No. 60/401,285, filed Aug. 6, 2002 and entitled "Management of Corporate Entities".

FIELD

The present invention relates to the management of corporate entities. In particular, the present invention relates to efficient management of information relating to a plurality of interrelated and/or unrelated corporate entities.

BACKGROUND

Modern business transactions commonly involve several corporate entities. In a typical transaction, each involved corporate entity may be owned by several shareholders, one or more of which may be another of the involved entities. The entities may also have different corporate structures, reporting requirements and applicable laws that should be appropriately dealt with during the transaction. In order to prepare transaction documents and execute procedures that address each of these concerns, entity representatives are often required to track and manage officers, documents and other specific characteristics associated with each entity.

Specific characteristics of corporate entities come into play even outside the context of a particular transaction. In this regard, corporate "housekeeping" required by laws applicable to a particular entity includes activities such as electing officers, complying with tax and regulatory filing deadlines, and holding board meetings. Again, these activities require tracking of a myriad of details for each corporate entity.

Recently, computer databases have been employed to track information associated with corporate entities. According to these systems, tax-related information is tracked and accessed by an accounting department, while corporate structure information is tracked and accessed by a corporate department. Oftentimes the systems employed by each department are incompatible, thereby inhibiting transfer of information among departments. Even if information associated with several corporate entities were available in a centrally-accessible data depository, current systems are unable to present the data in a manner that facilitates efficient tracking, editing and/or use thereof.

In view of the foregoing, what is needed are improvements in the management of information associated with corporate entities. Such improvements may in turn enable efficient management of the associated corporate entities.

SUMMARY

To address the foregoing, embodiments of the present invention concern a system, a method, an apparatus, a computer-readable medium storing processor-executable process steps, and means to present a plurality of selectable elements and an entity selection area, the entity selection area allowing selection of at least one corporate entity from a plurality of corporate entities, receive a selection of the at least one corporate entity, receive a selection of one of the plurality of selectable elements, determine information associated with the at least one corporate entity and the one selected element, and present the determined information to a user.

Embodiments of the present invention also provide a user interface which includes interface an entity selection area allowing selection of at least one corporate entity from a plurality of corporate entities, and a plurality of selectable elements, each of the selectable elements being selectable to cause presentation of an associated area, wherein an area associated with each of the plurality of selectable elements presents information relating to the at least one corporate entity and to the associated selectable element.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 5 is a representative view of a tabular portion of an entity relationship database according to some embodiments of the present invention.

FIG. 6 is a representative view of a tabular portion of a general information database according to some embodiments of the present invention.

FIG. 7 is a representative view of a tabular portion of a legal database according to some embodiments of the present invention.

FIG. 8 is a representative view of a tabular portion of a contacts database according to some embodiments of the present invention.

FIG. 9 is a representative view of a tabular portion of an owners database according to some embodiments of the present invention.

FIG. 10 is a representative view of a tabular portion of a regulators database according to some embodiments of the present invention.

FIG. 11 is a representative view of a tabular portion of an officers database according to some embodiments of the present invention.

FIG. 12 is a representative view of a tabular portion of a jurisdictions database according to some embodiments of the present invention.

FIG. 13 is a representative view of a tabular portion of a reporting database according to some embodiments of the present invention.

FIG. 14 is a representative view of a tabular portion of a controllers database according to some embodiments of the present invention.

FIG. 15 is a representative view of a tabular portion of a funds database according to some embodiments of the present invention.

FIG. 16 is a representative view of a tabular portion of a document generation database according to some embodiments of the present invention.

DETAILED DESCRIPTION

System Architecture

Figure 1:
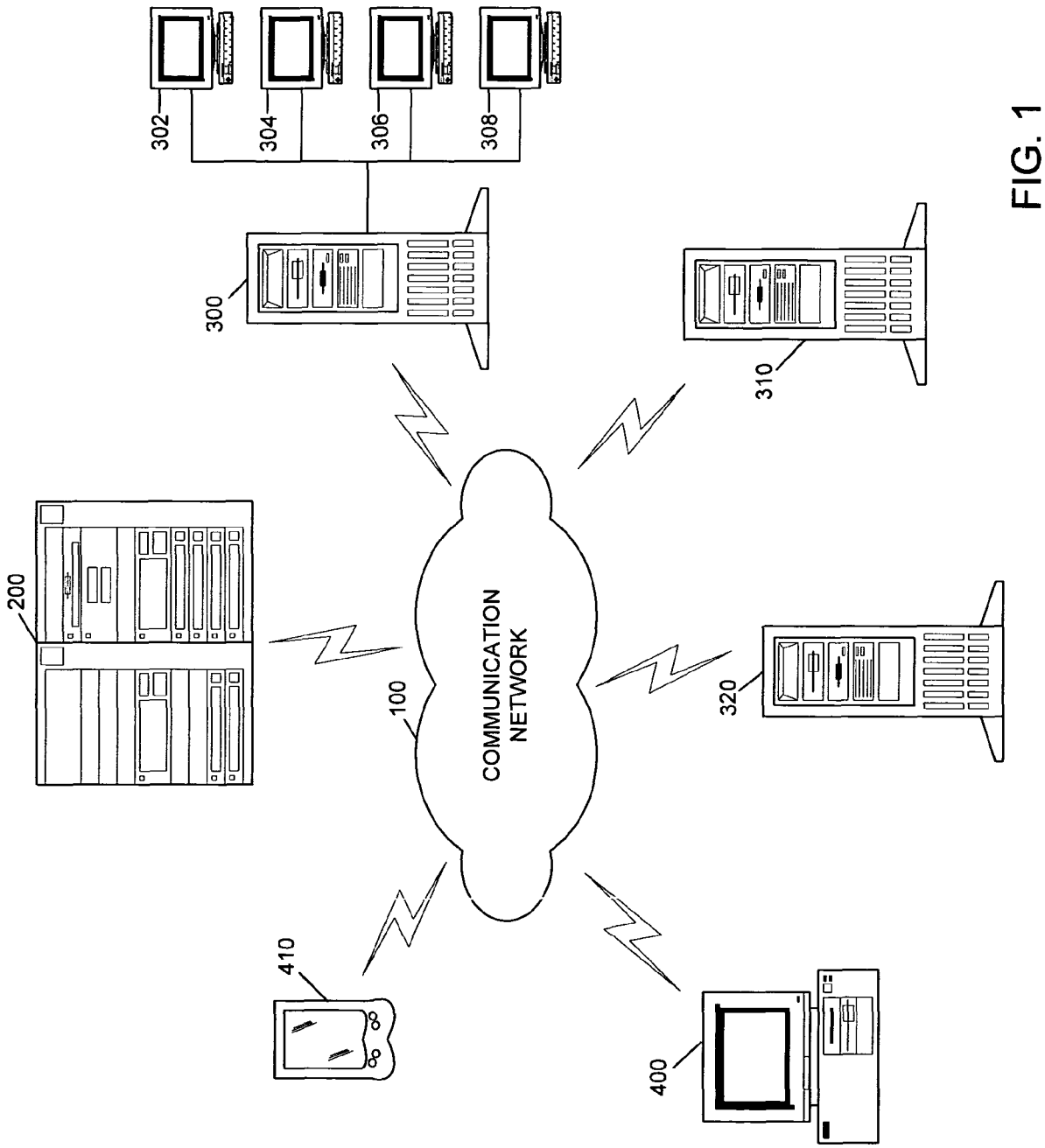
FIG. 1 is a topographic view of a network architecture according to some embodiments of the present invention.

FIG. 1 illustrates a network architecture of a system according to some embodiments of the present invention. As shown, communication network 100 provides communication between entity management server 200, entity servers 300, 310 and 320, and user devices 400 and 410.

Communication network 100 may comprise any number of different systems for transferring data, including a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), a Bluetooth network, an Infrared Radiation (IR) network, and/or an IP network such as the Internet, an intranet or an extranet. As used herein, the term "communication" can refer to wired and/or wireless communication as appropriate.

Entity management server 200 is used to provide an interface to facilitate the management of corporate entities in accordance with some embodiments of the invention. As will be described in detail below, such an interface may be provided through presentation of a plurality of selectable elements and an entity selection area, the entity selection area allowing selection of at least one corporate entity from a plurality of corporate entities, receive a selection of the at least one corporate entity, reception of a selection of one of the plurality of selectable elements, determination of information associated with the at least one corporate entity and the one selected element, and presentation of the determined information to a user.

In one specific example, entity management server 200 receives information associated with corporate entities from many different sources such as entity servers 300, 310 and 320 and stores the information in appropriate databases of server 200. Entity management server 200 then receives a request for information from one of user devices 400 and 410. The requested information is retrieved from the databases of entity management server 200 and used to create an interface according to some embodiments of the invention. The interface is presented to the user device from which the request was received, and the user device in turn presents the interface to a user. This and other specific examples are discussed in more detail below.

Entity management server 200 is depicted as a mainframe server in FIG. 1, but may comprise any device or devices capable of performing process steps attributed to server 200 herein. Moreover, entity management server 200 may provide entity management services to more than one managing entities. Other services may also be provided by entity management server 200, including functions usable by disparate companies, departments, and/or offices. In this regard, entity management server 200 may be operated by a company in order to manage corporate entities related to the company, or by a company providing this management as an outsourced function.

Entity servers 300, 310 and 320 store information relating to corporate entities. Each of servers 300, 310 and 320 may store information relating to a single respective entity, and one or more of servers 300, 310 and 320 may store information relating to two or more entities. In the former case, entity servers 300, 310 and 320 may comprise central data repositories maintained by their respective entities. The information stored in entity servers 300, 310 and 320 may therefore be generated by business activities of the respective entities. The information may also be input by an operator having authorization to input information. As shown, entity server 300 also functions as a network server for serving applications and data to terminals 302 through 308.

User devices 400 and 410 comprise a personal computer and a personal digital assistant, respectively. User devices 400 and 410 are capable of communicating with entity management server 200 over communication network 100, and of presenting an interface to a user in operation thereof. In some embodiments, such an interface includes an entity selection area allowing selection of at least one corporate entity from a plurality of corporate entities, and a plurality of selectable elements, each of the selectable elements being selectable to cause presentation of an associated area, wherein an area associated with each of the plurality of selectable elements presents information relating to the at least one corporate entity and to the associated selectable element.

In other embodiments, the devices of FIG. 1 are connected differently than as shown. For example, some or all of the devices may be connected directly to one another. Of course, embodiments of the invention may include devices that are different from those shown. It should also be noted that although the devices are shown in communication with each other, the devices need not be constantly exchanging data. Rather, communication may be established when necessary and severed at other times or always available but rarely used to transmit data. Moreover, although the illustrated communication links appear dedicated, it should be noted that each of the links may be shared by other devices.

Entity Management Server

Figure 2:
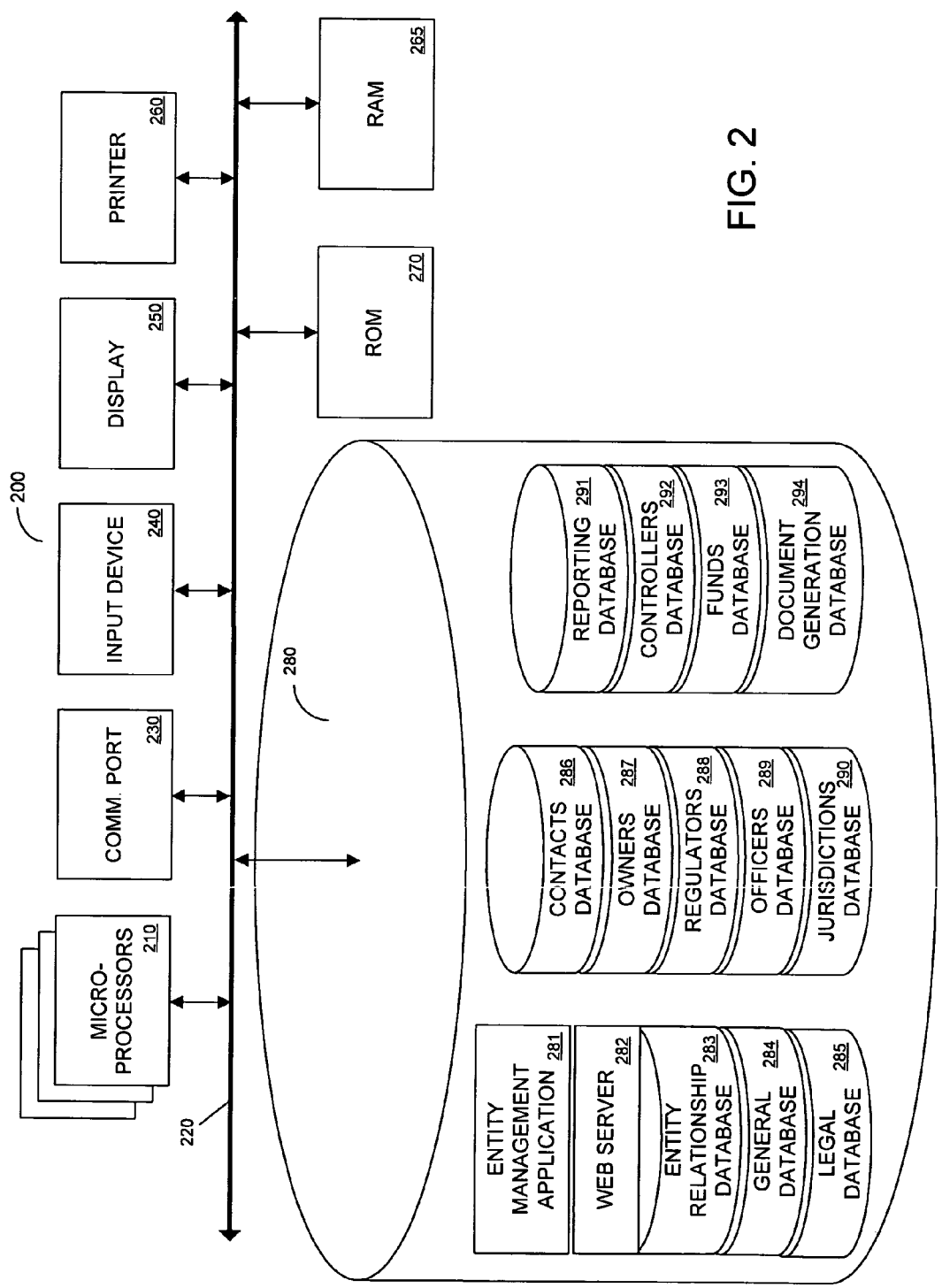
FIG. 2 is a block diagram of an internal architecture of an entity management server according to some embodiments to the present invention.

FIG. 2 is a block diagram of an internal architecture of entity management server 200 according to some embodiments of the invention. As illustrated, entity management server 200 includes microprocessors 210 in communication with communication bus 220. Microprocessors 210 may comprise RISC-based and other types of processors and are used to execute processor-executable process steps so as to control the elements of entity management server 200 to provide desired functionality.

Also in communication with communication bus 220 is communication port 230. Communication port 230 is used to transmit data to and to receive data from devices external to entity management server 200 such as devices 300 through 510. Communication port 230 is therefore preferably configured with hardware suitable to physically interface with desired external devices and/or network connections. For example, communication port 230 may comprise an Ethernet connection to a local area network through which entity management server 200 may receive and transmit information over the Web.

Input device 240, display 250 and printer 260 are also in communication with communication bus 220. Any known input device may comprise input device 240, including a keyboard, mouse, touch pad, voice-recognition system, or any combination of these devices. Of course, information may also be input to entity management server 200 from other devices via communication port 230. Display 250 may be an integral or separate CRT display, flat-panel display or the like used to display graphics and text in response to commands issued by microprocessors 210. Printer 260 may also present text and graphics to an operator, but in hardcopy form using ink-jet, thermal, dot-matrix, laser, or other printing technologies. Elements 240 through 260 are most likely used sparingly during operation of entity management server 200, but may be used by an operator for setup and administration.

RAM 265 is connected to communication bus 220 to provide microprocessors 210 with fast data storage and retrieval. In this regard, processor-executable process steps being executed by microprocessors 210 are typically stored temporarily in RAM 265 and executed therefrom by microprocessors 210. ROM 270, in contrast, provides storage from which data can be retrieved but to which data cannot be stored. Accordingly, ROM 270 is used to store invariant process steps and other data, such as basic input/output instructions and data used during boot-up of entity management server 200 or to control communication port 230. It should be noted that one or both of RAM 265 and ROM 270 may communicate directly with microprocessors 210 instead of over communication bus 220.

Data storage device 280 stores, among other data, processor-executable process steps of entity management application 281. Microprocessors 210 therefore execute the process steps of entity management application 281 in order to control entity management server 200 to facilitate corporate entity management according to some embodiments of the present invention.

The process steps of entity management application 281 may be read from a computer-readable medium, such as a floppy disk, a CD-ROM, a DVD-ROM, a Zip™ disk, a magnetic tape, or a signal encoding the process steps, and then stored in data storage device 280 in a compressed, uncompiled and/or encrypted format. In alternative embodiments, hard-wired circuitry may be used in place of, or in combination with, processor-executable process steps for implementation of processes according to embodiments of the present invention. Thus, embodiments of the present invention are not limited to any specific combination of hardware and software.

Process steps of Web server 282 are also stored in data storage device 280. These process steps may be executed by microprocessors 210 to transmit data to and to receive data from Web clients, such as Web browsers, over the Web. The data may include information from entity servers 300, 310 and 320, requests for information from user devices 400 and 410, and interfaces facilitating the management of corporate entities according to some embodiments of the present invention.

Entity relationship database 283 of data storage device 280 specifies relationships between corporate entities managed according to the present embodiment. In some embodiments, the specified relationships indicate that a certain entity is downstream of another entity, for example in a case that the certain entity is a subsidiary of the another entity. In another example, a parent company is indicated as being an upstream entity to its child companies. The information stored in entity relationship database 283 is used in some embodiments to create an interface including an entity selection area that allows selection of at least one corporate entity from a plurality of corporate entities.

Data storage device 280 also stores several other databases according to some embodiments of the present invention. Specifically, general database 284 stores information relating to the formation of a plurality of entities, while legal database 285 includes data indicating legally-related information such as locations of legal documents and the like. Contacts database 286 and owners database 287 respectively provide information regarding individuals having some relation to a plurality of corporate entities, and information identifying owners and ownership details of a plurality of corporate entities. Regulators database 288 identifies regulatory entities associated with corporate entities, and officers database 289 specifies officers of corporate entities managed according to embodiments of the present invention.

Jurisdictions database 290 includes information related to an entity's qualifications to do business in one or more jurisdictions, and reporting database 291 specifies reporting requirements applicable to one or more of the managed entities. Controllers database 292 and funds database 293 store information respectively relating to controllers of corporate entities and to funds controlled by the managed corporate entities. Document generation database 294 includes information usable to automatically generate documents including information specified in one or more of databases 283 through 293. Such document generation provides increased efficiency over previous systems for preparing documents that include often hard-to-retrieve information relating to several corporate entities.

The information stored in databases 283 through 294 may be received from entity servers such as servers 300, 310 and 320, from an operator of entity management server 200, or from another device. In some embodiments, the information is used to create an interface for managing corporate entities according to embodiments of the present invention.

Also stored in data storage device 280 may also be other unshown elements that may be necessary for operation of entity management server 200, such as an operating system, a database management system, other applications, other data files, and "device drivers" for allowing microprocessors 210 to interface with devices in communication with communication port 230. These elements are known to those skilled in the art, and are therefore not described in detail herein.

Entity Server

Figure 3:
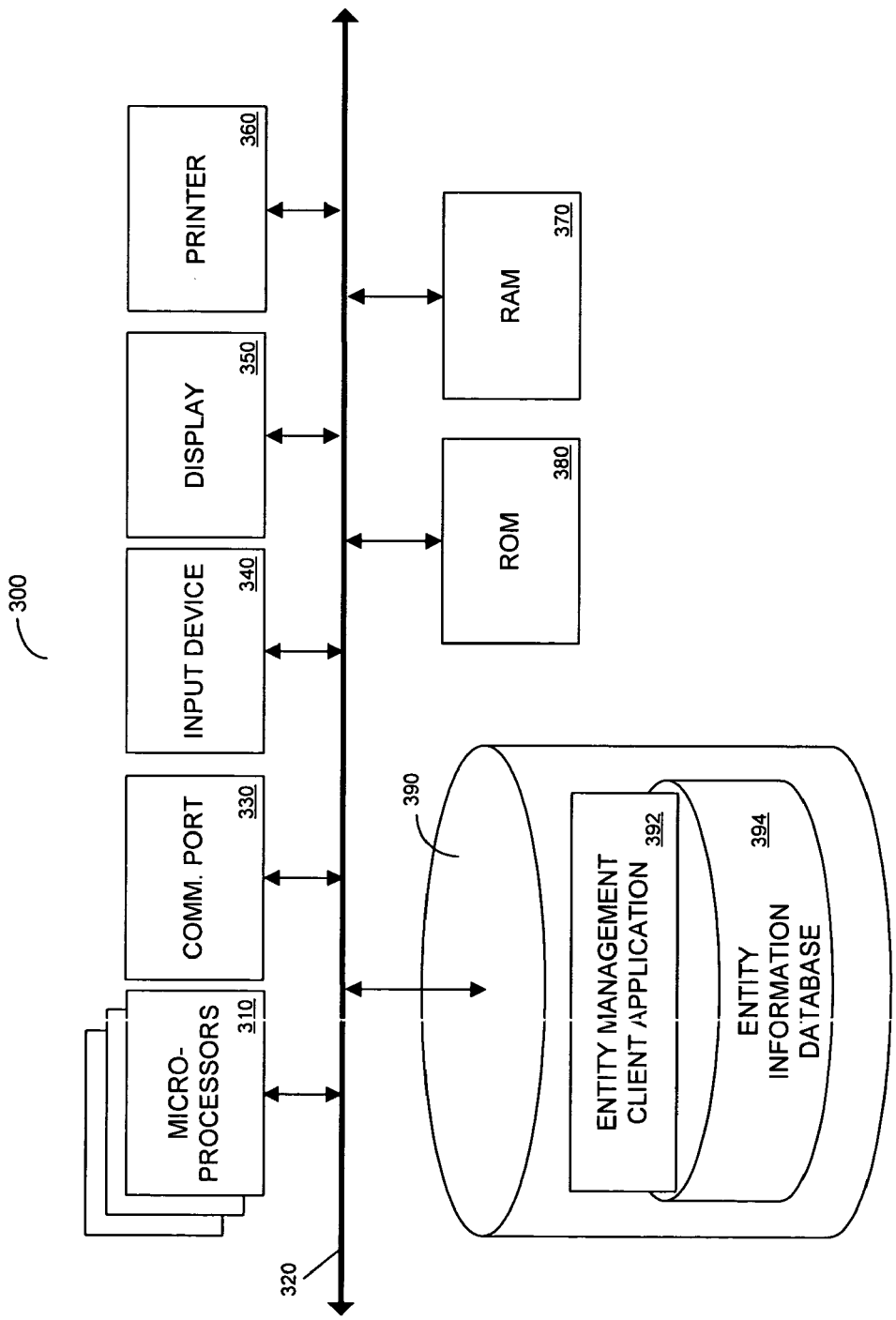
FIG. 3 is a block diagram of an internal architecture of a corporate entity server according to some embodiments to the present invention.

FIG. 3 is a block diagram of the internal components of entity server 300 according to some embodiments of the invention. It should be noted that these distinct components may comprise any of the specific examples given above with respect to identically-named components of entity management server 200. Of course, specific functions performed by the components may differ from the functions performed by the identically-named components.

In operation, process steps of entity management client application 392 are executed by microprocessors 310 to collect and transfer information associated with one or more corporate entities to entity management server 200. As mentioned above, the information may be collected over communication port 330 during normal business operations and/or through periodic querying of departmental or company-wide data repositories in communication with entity server 300. The information may also be input by an operator using input device 340 and display 350. The information is stored in entity information database 394, which may include information related to one or more corporate entities.

It should be noted that entity management client application 392 may include process steps usable to establish communication with and exchange data with entity management application 281. In this regard, entity server 300 may include any software and/or hardware suitable to perform the steps described herein.

User Device

Figure 4:
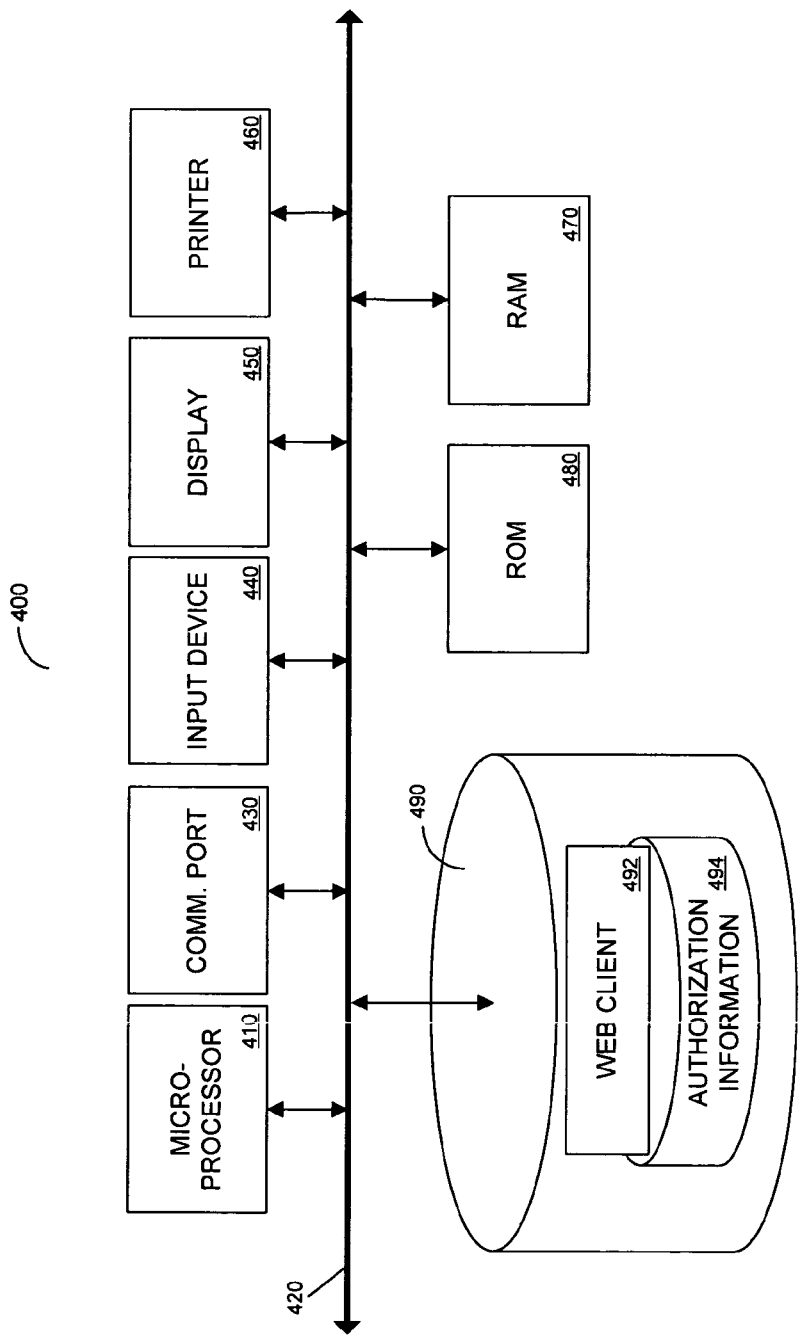
FIG. 4 is a block diagram of an internal architecture of a user device according to some embodiments to the present invention.

FIG. 4 illustrates several components of user device 400 according to some embodiments of the invention. Again, the illustrated components may comprise any of the specific examples given above with respect to identically-named components of user administration server 200 and/or entity server 300. For example, communication port 430 may be used to transmit requests for information to entity management server 200. In this regard, input device 440 may be used in conjunction with display 450 to request and to present an interface according to some embodiments of the invention. Input device 440, display 450 and printer 460 may also be used in conjunction with other applications provided by user device 400 which are unrelated to the present invention.

Storage device 490 of user device 400 stores processor-executable process steps of Web client 492, such as a Web browser. The process steps may be executed by microprocessor 410 to allow communication with Web servers such as Web server 282 of entity management server 200. Authorization information database 494 includes information that may be transmitted to entity management server 200 and used thereby to determine whether a user of user device 400 is authorized to view some or all of an interface according to embodiments of the present invention.

Storage device 490 may store one or more of other applications, data files, device drivers and operating system files needed to provide functions other than those directly related to the present invention. Such functions may include calendaring, e-mail access, word processing, accounting, presentation development and the like.

Databases

A tabular representation of a portion of entity relationship database 283 is shown in FIG. 5. As described above, the information stored in entity relationship database 283 specifies relationships between corporate entities and may be used to construct an entity selection area of an interface according to some embodiments of the present invention. Entity relationship database 293 of FIG. 5 includes several records, each consisting of several fields. The fields include entity Id field 501, upstream entities field 502, and downstream entities field 503.

Entity Id field 501 includes an identifier that may be used throughout the databases described herein to identify a particular corporate entity. In particular, the identifier associated with a record of entity relationship database 283 identifies a corporate entity associated with data populating other fields of the record. The identifier may be assigned by entity management server 200 or may be received from another device.

Upstream entities field 502 includes identifiers of entities that are organizationally upstream from the subject entity, such as a parent company or partial owner of the subject entity. Downstream entities field 503 similarly includes identifiers of entities that are organizationally downstream from the subject entity, such as a subsidiary or the like. As shown, a particular entity may be associated with multiple upstream and downstream entities.

The information stored in entity relationship database 283, as well as that stored in each other of the databases of entity management server 200, may be received from a variety of sources, including entity servers such as entity servers 300, 310 and 320, user devices such as user devices 400 and 410, an operator manually inputting the information using input device 240, and other devices.

FIG. 6 illustrates a tabular representation of a portion of general database 284. General database 284 stores information relating to the formation of a plurality of entities. Specifically, the fields of each record of database 284 include entity Id field 601, name field 602, type field 603, status field 604, domicile field 605, taxpayer Id field 606, formed field 607, and dissolved field 608. Entity Id field 601 of a record is used to identify an entity with which data of the record are associated. Name field 602, type field 603, status field 604, domicile field 605 and taxpayer Id field 606 specify respectively-named information for each record. Formed field 607 and dissolved field 608 indicate dates on which an associated entity was formed and dissolved, if ever.

A tabular representation of a portion of legal database 285 is shown in FIG. 7. Legal database 285 specifies legally-related information such as locations of legal documents and the like. The records of database 285 include entity id field 701, which identifies a particular corporate entity. Original minute book field 702, duplicate minute book field 703, corporate seal field 704 and stock certificate field 705 specify locations of the original minute book, duplicate minute book, corporate seal, and stock certificate of an associated entity. Directors field 706 indicates a number of directors and quorum field 707 specifies a number of directors required for a quorum under the rules of an associated entity.

The tabular portion of contacts database 286 illustrated in FIG. 8 stores information associated with individuals having some relation to a corporate entity. In particular, for each individual reflected in contacts database 286, a record specifies an entity with which the individual is associated in entity Id field 801, a name of the individual in contact field 802, the individual's title in title field 803, a start date associated with the individual in start date field 804, an associated end date in end date field 805, and information for contacting the individual in contact information field 806.

FIG. 9 illustrates a tabular representation of a portion of owners database 287. As shown, owners database 287 includes information identifying owners and ownership details of a plurality of corporate entities. In particular, each record of owners database 287 includes entity Id field 901, owner Id field 902, type field 903, start date field 904, end date field 905, and percent holding field 906.

Entity ID field 901 indicates an entity wholly or partially owned by an entity specified in associated owner Id field 902. Accordingly, a single entity having multiple owners may be the subject of multiple records of owners database 287. Type field 903 specifies the type of ownership relationship reflected in a record, while start date field 904 and end date field 905 respectively specify a start date and an end date of the ownership relationship. Percent holding field 906 of a record specifies a percent of the entity identified in entity Id field 901 of the record that is held by the entity identified in owner Id field 902 of the record.

FIG. 10 illustrates a tabular representation of a portion of regulators database 288. The portion includes several records, each including entity Id field 1001, regulator field 1002, and country/region field 1003. In each record, regulator field 1002 associates a regulator with a corporate entity identified in entity Id field 1001. Country/region field specifies a geographical area in which the regulator possesses jurisdiction. Accordingly, regulatory requirements applicable to an entity may be determined based on the information populating regulators database 288.

A representation of a tabular portion of officers database 289 is illustrated in FIG. 11. Each record of officers database 289 associates information relating to a corporate officer with an entity of which the officer is an officer. More particularly, each record includes entity Id field 1101, name field 1102, title field 1103, and signatory power field 1104. The latter three fields specify a name, title and signatory power of an officer of the entity identifies by the former field.

FIG. 12 illustrates a tabular representation of a portion of jurisdictions database 290. Jurisdictions database 290 stores information related to an entity's qualifications to do business in one or more jurisdictions. Specifically, the fields of each record of database 290 include entity Id field 1201, qualified field 1202, type field 1203, reporting field 1204, jurisdiction Id field 1205, qualify date field 1206, and expire field 1207. Entity Id field 1201 identifies a subject entity, while qualified field 1202 specifies a jurisdiction in which the entity is qualified to do business. Type field 1203 and reporting field 1204 identify the type of presence the entity has in the jurisdiction, and whether the jurisdiction requires any type of reporting. Jurisdiction Id field 1205 includes an identifier used by the jurisdiction to identify the entity, and may comprise a taxpayer identifier or the like. Qualify date 1206 and expire date 1207 respectively indicate a date on which the entity became qualified to do business in the jurisdiction, and a date on which the qualification will expire.

A tabular representation of a portion of reporting database 291 is shown in FIG. 13. Reporting database 291 specifies information relating to the reporting requirements applicable to particular corporate entities. These requirements may be mandatory, optional, or otherwise applicable. The records of database 291 include entity id field 1301, which identifies a particular corporate entity. Report field 1302 specifies a report that is the subject of the record, and domicile/jurisdiction field 1303 identifies the domicile and/or jurisdiction for which the report is required. Due field 1304 and sent field 1305 respectively identify dates on which the subject report is due and was sent. Although database 291 as illustrated in FIG. 13 shows reports associated with a single corporate entity, it should be noted that database 291 may describe reports associated with a plurality of entities.

FIG. 14 illustrates a tabular representation of a portion of controllers database 292. Controllers database 292 stores information related to an entity's financial controllers. The fields of each record of database 292 include entity Id field 1401, consolidation type field 1402, controllers entity type field 1403, SAO Id field 1404, SAO contact information field 1405, and SCRP automated flag 1406.

A tabular representation of a portion of funds database 293 is shown in FIG. 15. Funds database 293 specifies information relating to the funds associated with particular corporate entities. The records of database 293 include entity Id field 1501, which identifies a particular corporate entity. Trustee field 1502 names a trustee, while board notice field 1503 and board quorum field 1504 provide information for convening an associated board. Annuals due field 1505 specifies when annual information associated with the funds are due.

FIG. 16 illustrates a tabular representation of a portion of document generation database 294. The portion includes several records, each including document Id field 1601, document name field 1602, and document template field 1603. In each record, document name field 1602 associates a document name with a document Id specified in document Id field 1601. Document template field 1603 specifies a location of an electronic file including a document template. Accordingly, document generation database 294 includes information usable to automatically generate documents including information specified in one or more of databases 283 through 293.

It should be noted that the illustrations and accompanying descriptions of databases included herein merely represent relationships between stored information. A number of other arrangements may be employed besides those suggested, including arrangements in which some or all of the specified data is located remote from the device with which it is associated herein. It is further contemplated that each of the databases may include many more records than those shown and that each record may include associated fields other than those illustrated.

Interface

Figure 17:
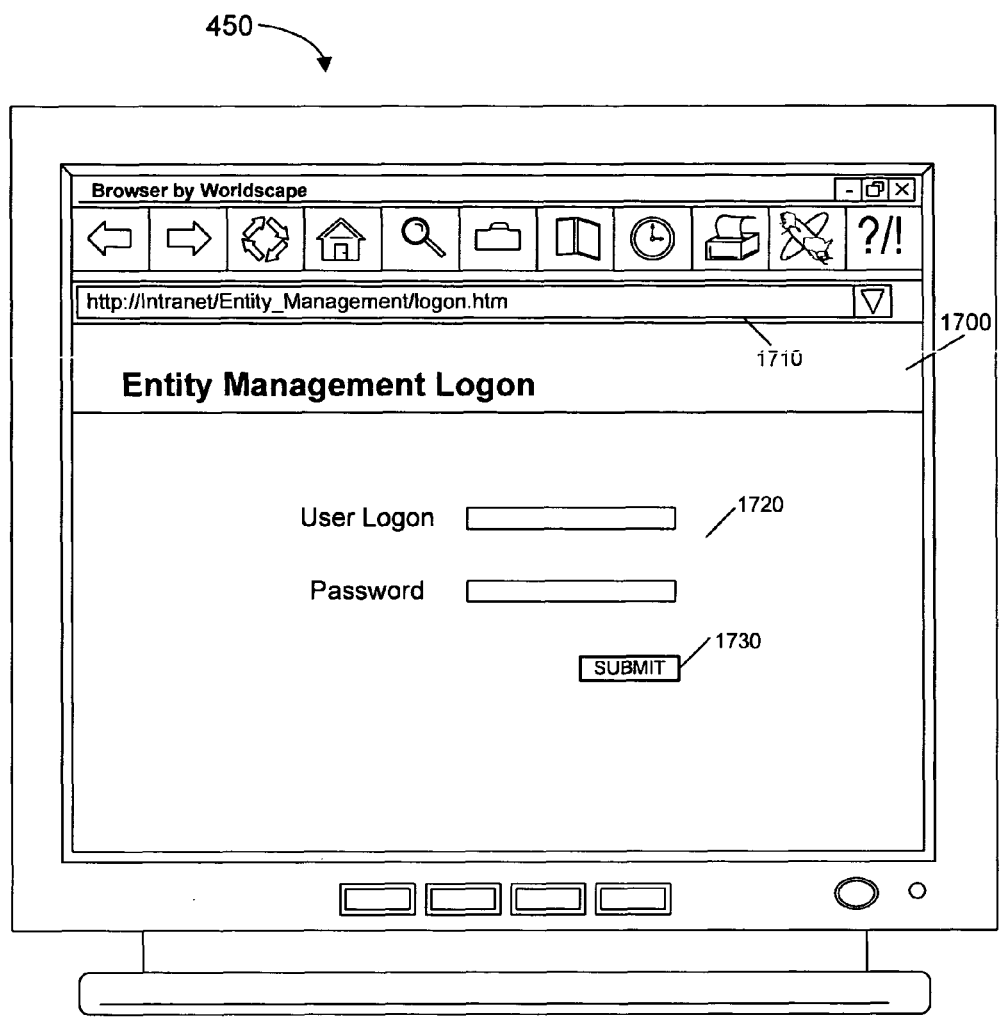
FIG. 17 is a representative view of an interface according to some embodiments of the present invention.
Figure 18:
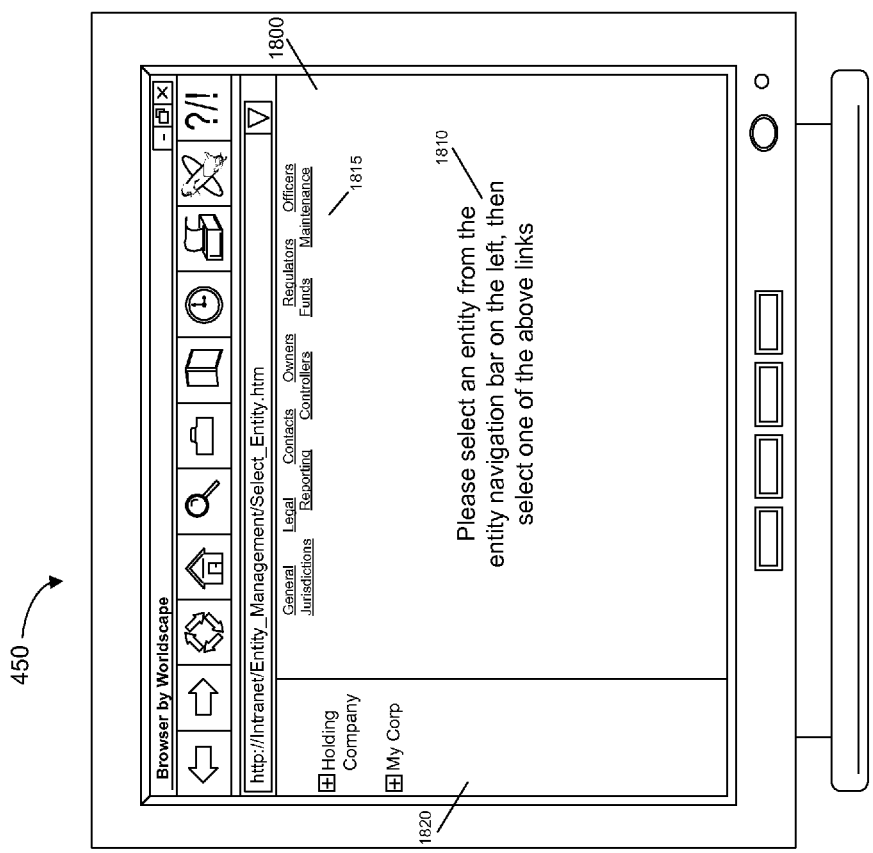
FIG. 18 is a representative view of an interface according to some embodiments of the present invention.

FIG. 17 illustrates an outward view of user interface 1700 as presented by display 450 of user device 400. According to some embodiments, a user operates input device 440 of user device 400 to input a Uniform Resource Locator (URL) into address bar 1710 of a window presented according to process steps of Web client 492. The process steps are executed to transmit a request for a Web page corresponding to the URL to Web server 282 of entity management server 200, and to receive the Web page therefrom.

In the present example, interface 1700 is the Web page received from entity management server 200. Interface 1700 includes input area 1720 for receiving logon information from the user, and Submit button 1730 for submitting the logon information to entity management server 200. Upon receiving the logon information, entity management application 281 determines whether the user is authorized to access interfaces according to some embodiments of the present invention. In this regard, authorization information 494 may also or alternatively be submitted to determine a user's authorization.

If the user is authorized to view information provided by the present example, entity selection interface 1800 is presented to user device 400 and in turn presented to the user via display 450. Interface 1800 includes instructions 1810, interface links 1815 and entity selection area 1820. Instructions 1810 instruct the user to select an entity from entity selection area 1820 and to select one of links 1815 to view corresponding information relating to the selected entity. As shown, the entities presented in entity selection area 1820 are associated with an icon indicating that downstream entities are associated with each entity. In this regard, information stored in entity relationship database may be used to construct selection area 1820.

Figure 19:
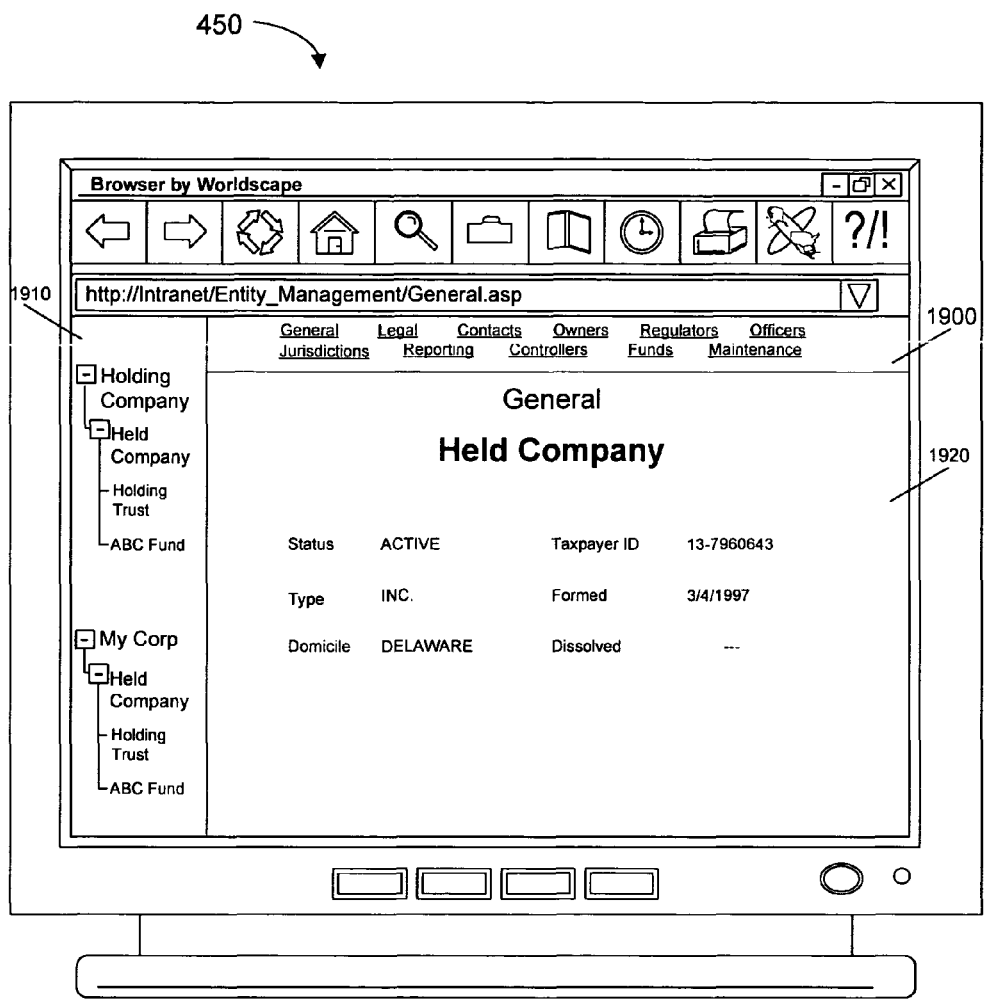
FIG. 19 is a representative view of an interface according to some embodiments of the present invention.
Figure 20:
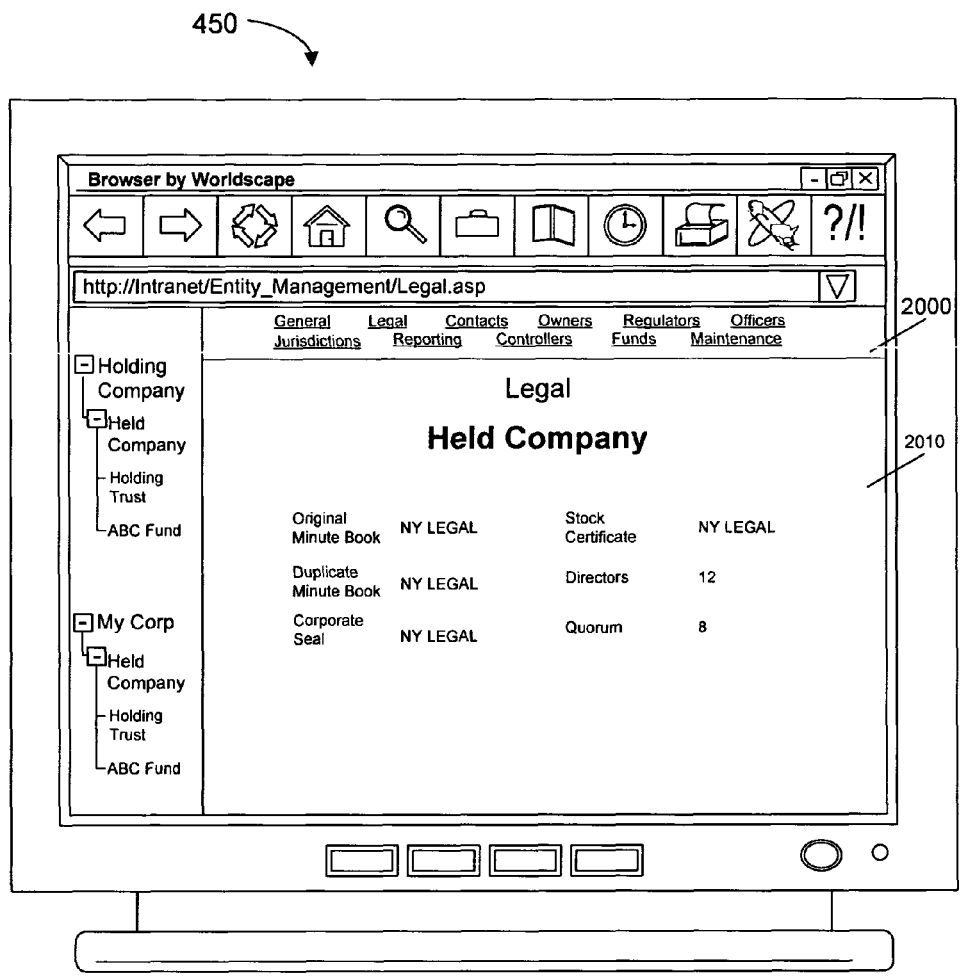
FIG. 20 is a representative view of an interface according to some embodiments of the present invention.

FIG. 19 illustrates user interface 1900, which is presented after the user selects the icons associated with the entities of entity selection area 1820, selects an entity from the resulting expanded tree structure, and selects the General link of links 1815. The expanded tree structure is shown in entity selection area 1910, and conforms to the information stored in entity relationship database 283. Main area 1920 presents information associated with the selected entity in general database 284. The user may select another entity from entity selection area 1910 to view information associated with the another entity in database 284, or may select another link to view other information associated with the originally-selected entity.

Figure 21:
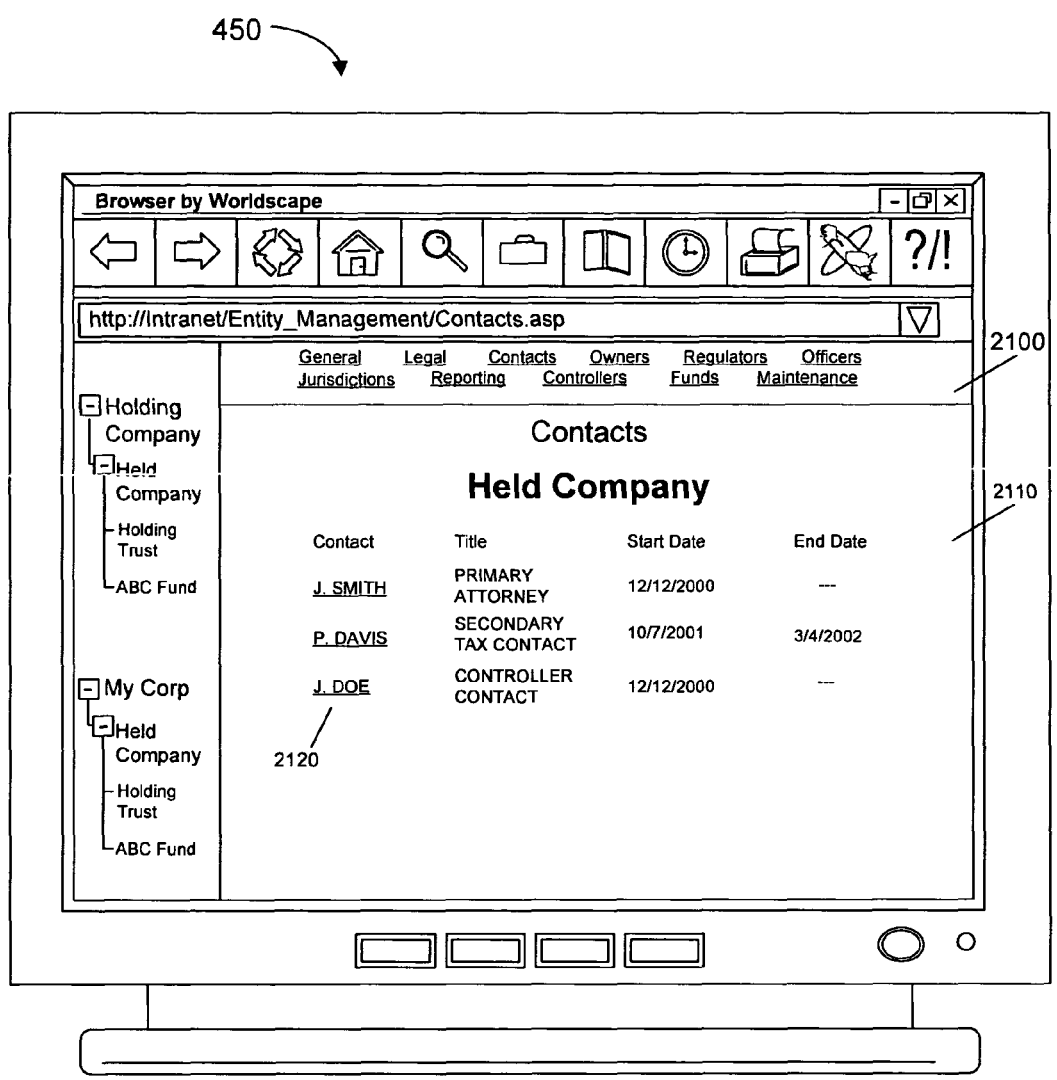
FIG. 21 is a representative view of an interface according to some embodiments of the present invention.

Interface 2000 is presented upon selection of the Legal link. Main area 2010 of interface 2000 presents information that is associated with the selected entity in legal database 285. Similarly, FIG. 21 shows that main area 2110 of interface 2100 presents contact information associated with the selected entity in contacts database 296. As also shown, contact names 2120 comprise hyperlinks that may be selected to view contact information associated with each contact name in database 296.

Figure 22:
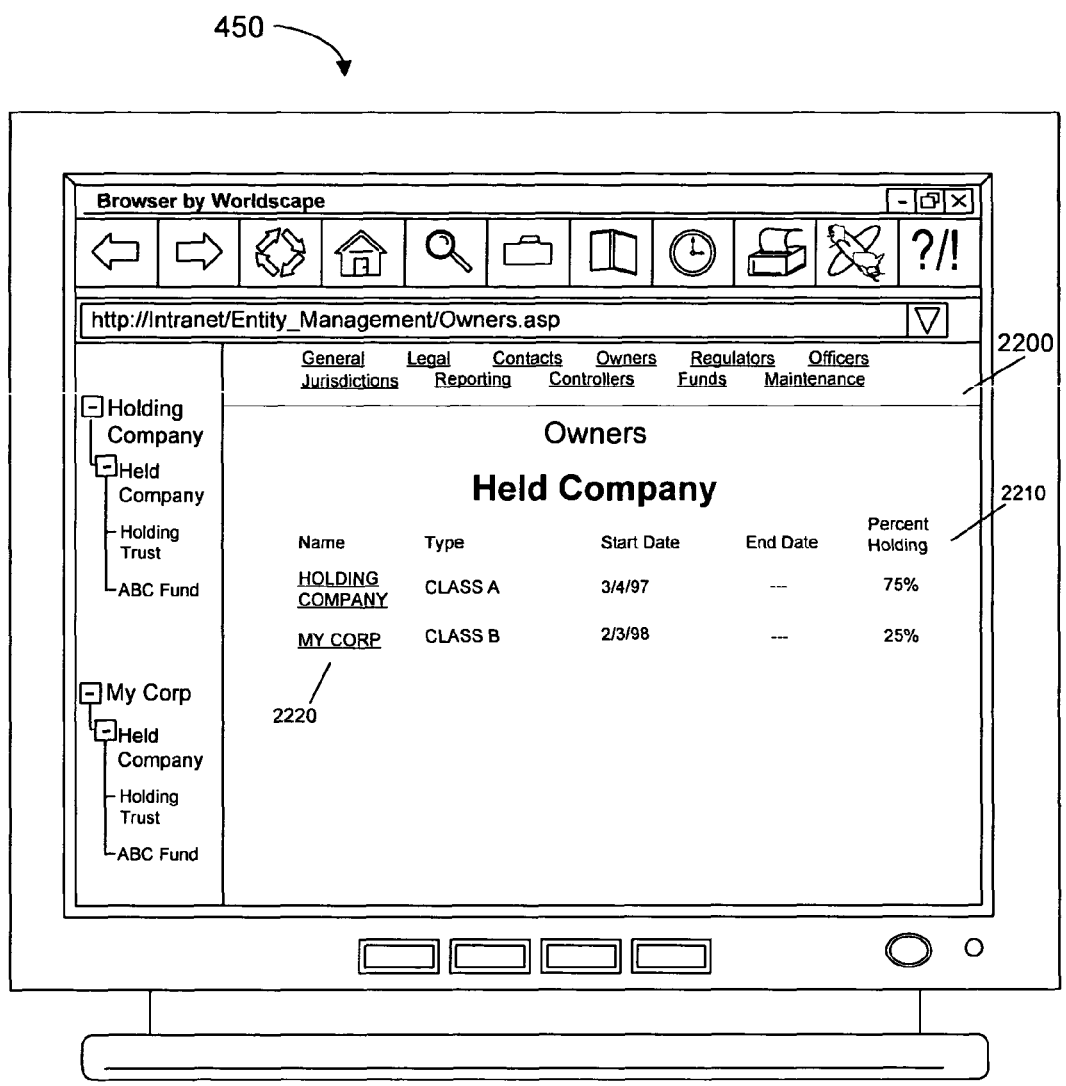
FIG. 22 is a representative view of an interface according to some embodiments of the present invention.
Figure 23:
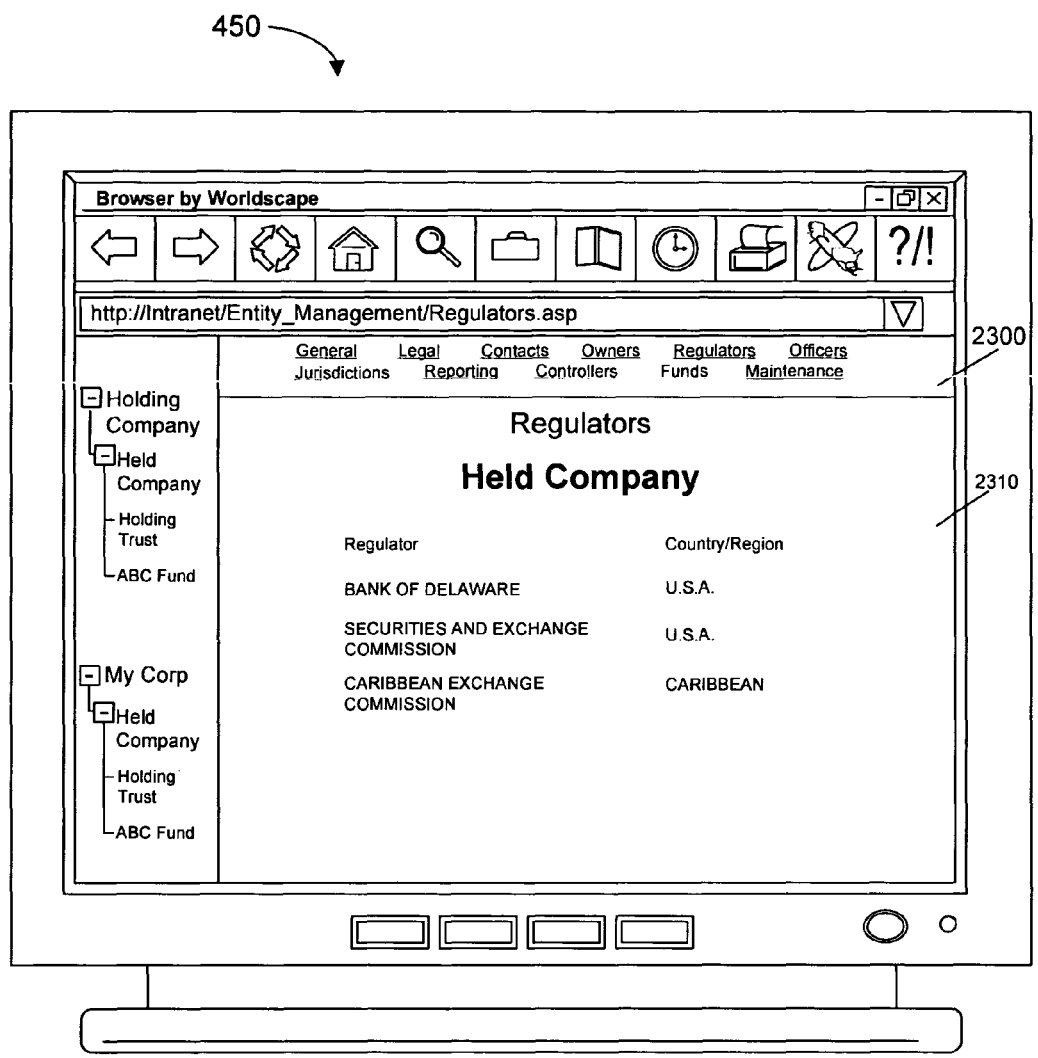
FIG. 23 is a representative view of an interface according to some embodiments of the present invention.

FIG. 22 illustrates interface 2200 as presented upon selection of the Owners link. Area 2210 of interface 2200 presents information associated with the selected entity in owners database 287. Like area 2110, area 2210 includes hyperlinks 2220 that may be selected to view information associated with the presented owners. Regulators interface 2300 of FIG. 23 presents, in area 2310, information stored in regulators database 288 that is associated with the selected entity in regulators database 288.

Figure 24:
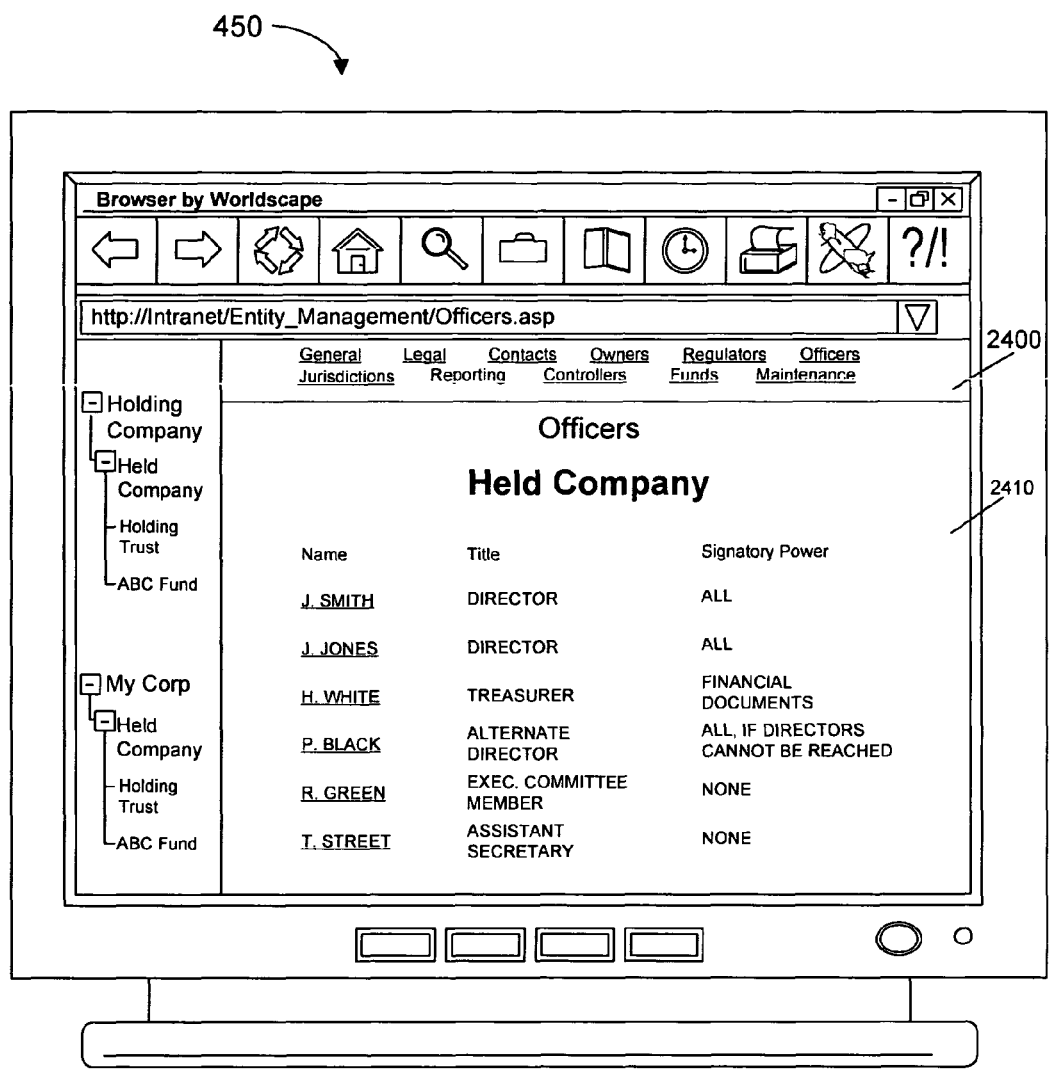
FIG. 24 is a representative view of an interface according to some embodiments of the present invention.
Figure 25:
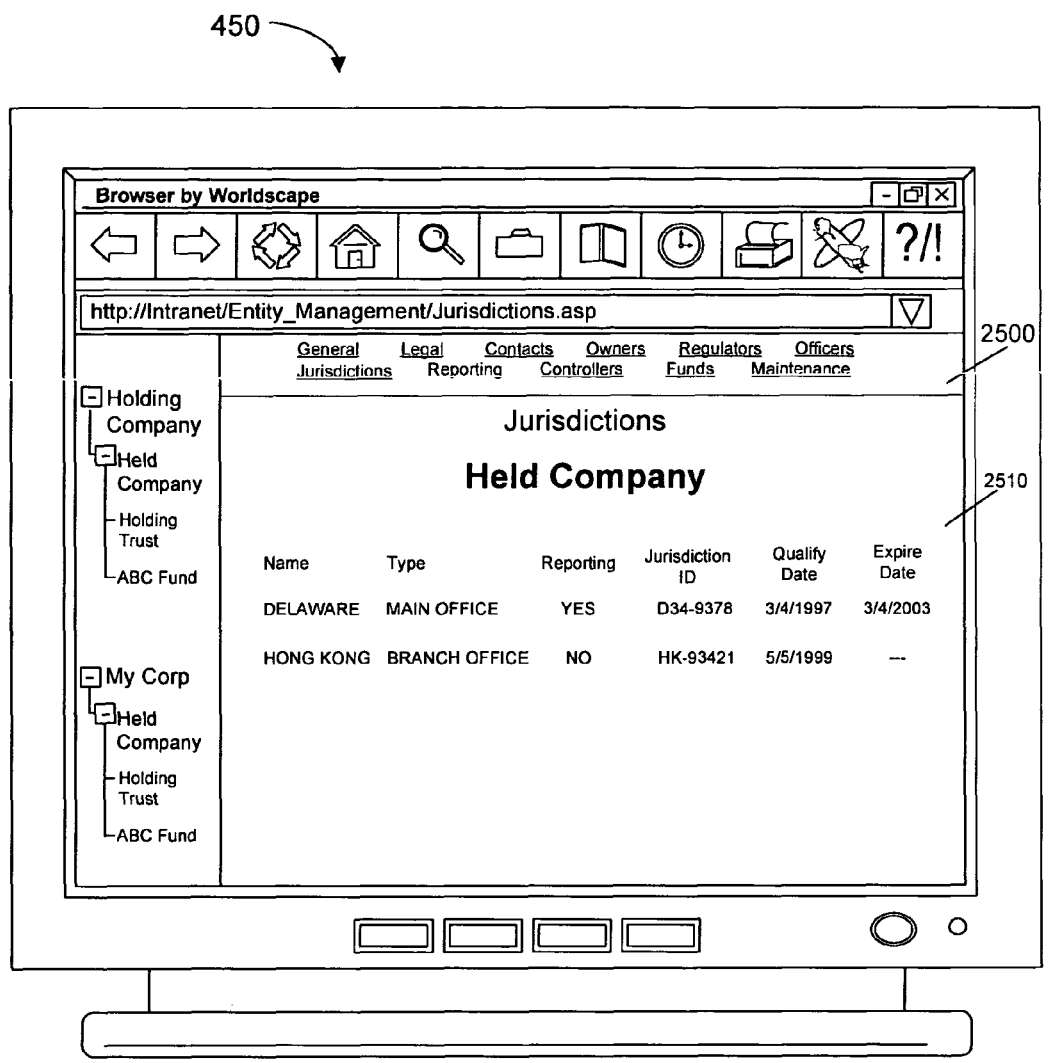
FIG. 25 is a representative view of an interface according to some embodiments of the present invention.

Information associated with the selected entity in officers database 289 is presented through user interface 2400 of FIG. 24. More specifically, area 2410 presents names, titles, and descriptions of signatory power for entity directors. Each name comprises a hyperlink that is selectable to view further information associated with the named officer. FIG. 25 shows the information of jurisdictions database 290 as reflected in area 2510 of interface 2500. Accordingly, interface 2500 is presented in response to user selection of the Jurisdictions link.

Figure 26:
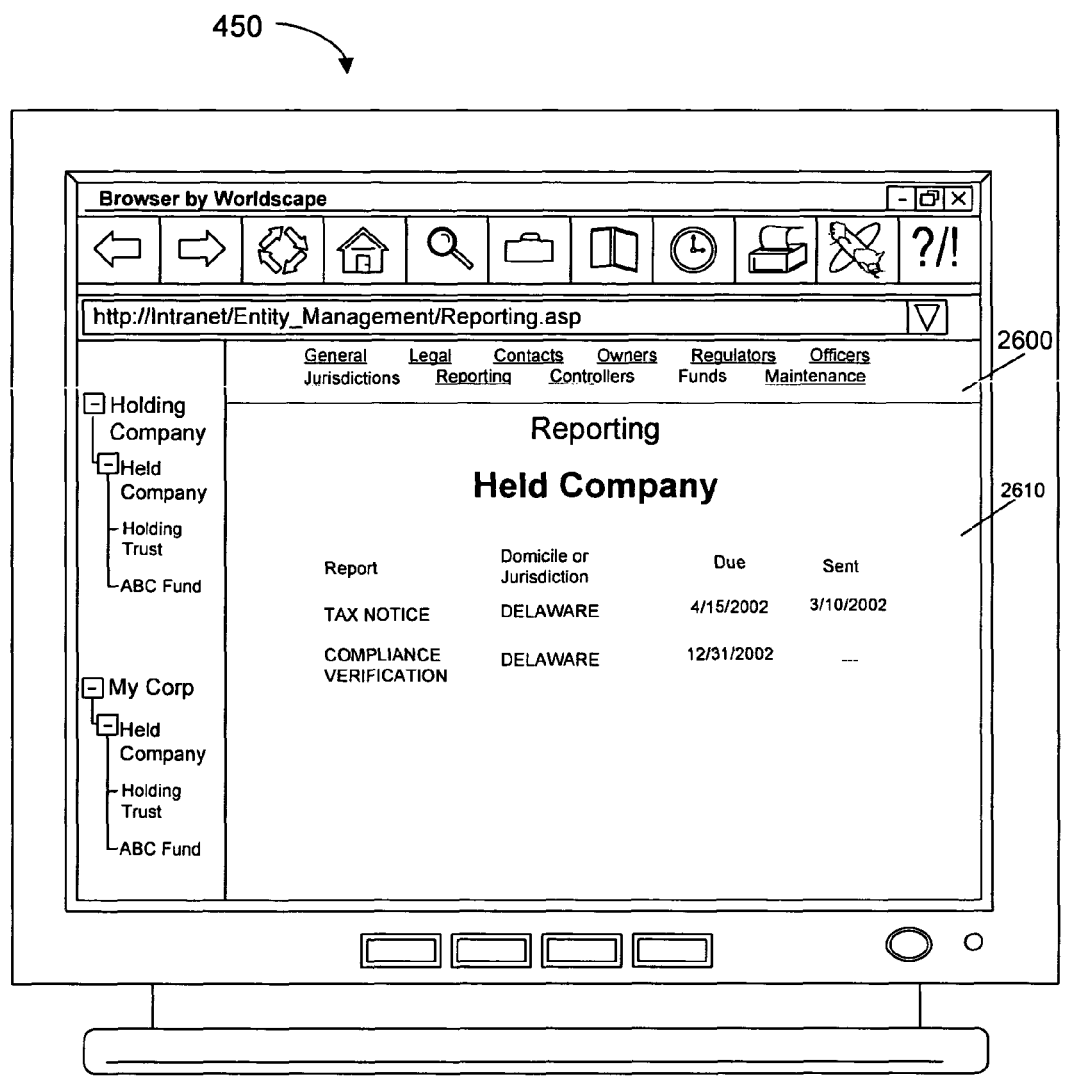
FIG. 26 is a representative view of an interface according to some embodiments of the present invention.
Figure 27:
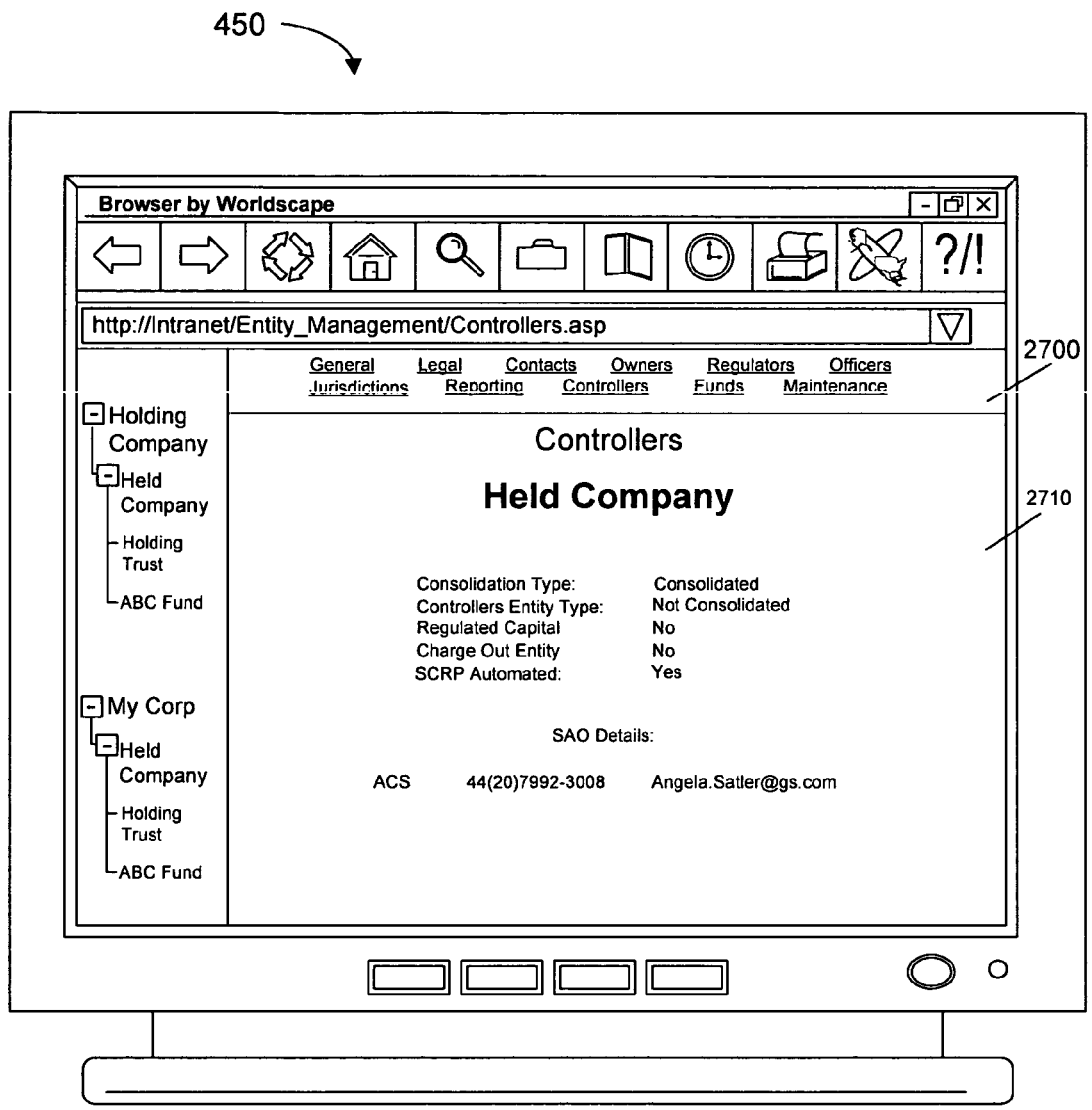
FIG. 27 is a representative view of an interface according to some embodiments of the present invention.
Figure 28:
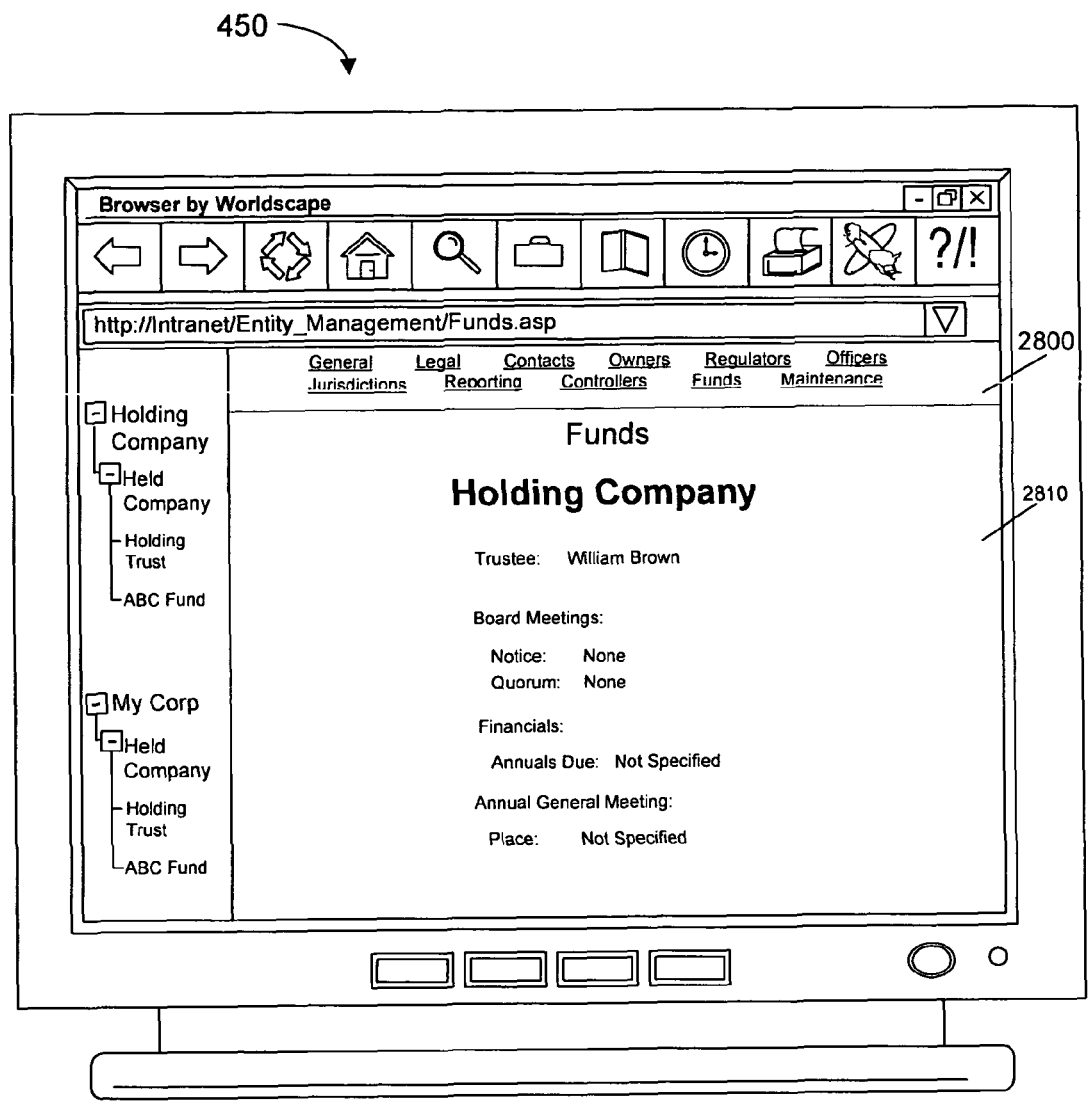
FIG. 28 is a representative view of an interface according to some embodiments of the present invention.

Selection of the Reporting link causes presentation of interface 2600. As shown in FIG. 26, area 2610 of interface 2600 presents information associated with the selected entity in reporting database 291. FIG. 27 shows interface 2700, which is presented in response to selection of the Controllers link. Area 2710 of interface 2700 presents information stored in controllers database 292. Similarly, FIG. 28 shows interface 2800 and area 2810, which are presented in response to selection of the Funds link. Accordingly, area 2810 presents information stored in funds database 293.

Figure 29:
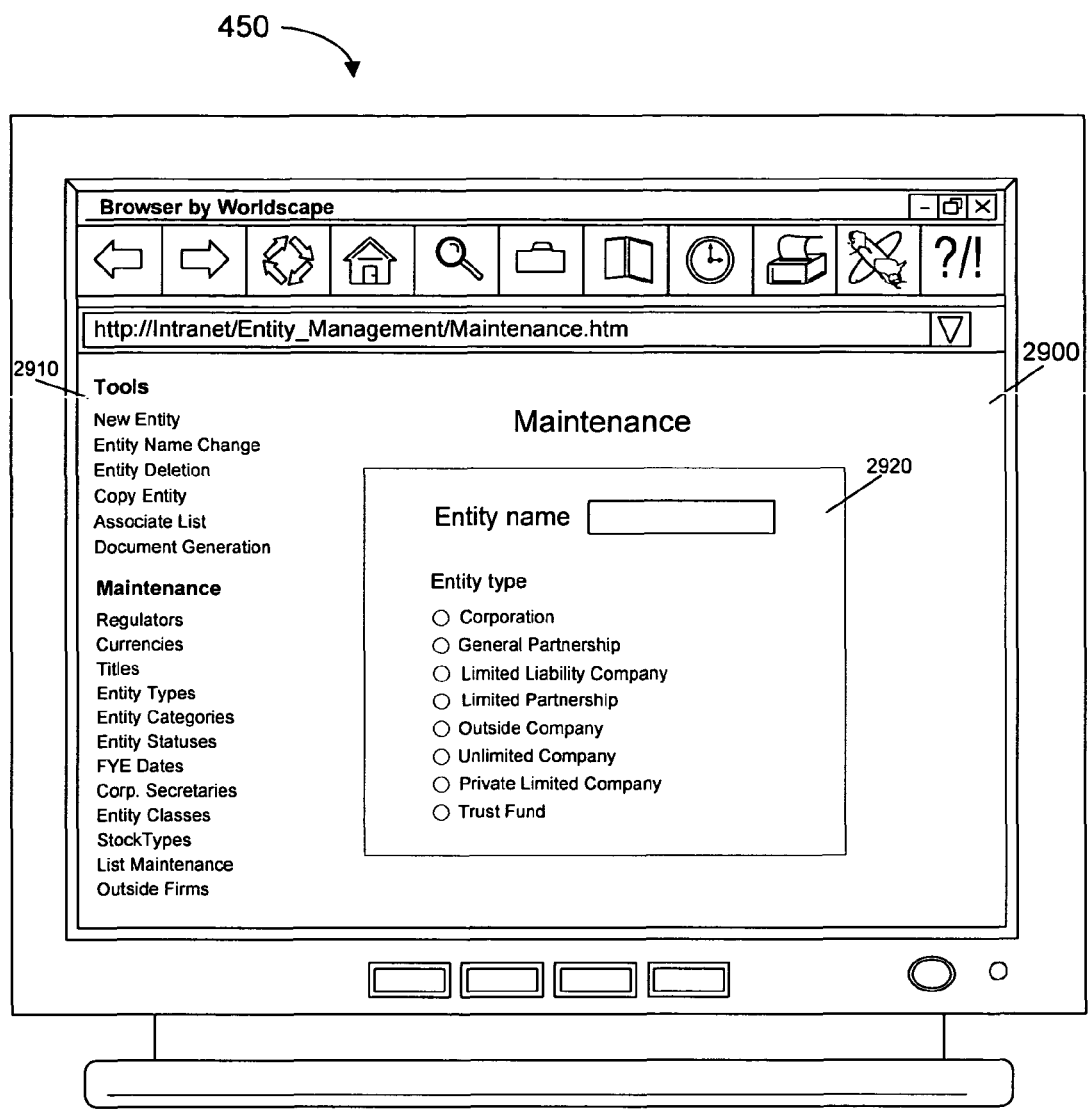
FIG. 29 is a representative view of an interface according to some embodiments of the present invention.

FIG. 29 shows display 450 presenting interface 2900. Interface 2900 is presented in response to user selection of the Maintenance link from any of the interfaces of FIGS. 18 through 28. Interface 2900 includes menu 2910 of Tools and Maintenance options. Any of these options may be selected in order to perform the task specified by the selected option. According to FIG. 29, the New Entity option has been selected and therefore main area 2920 includes an interface for defining a new entity.

Figure 30:
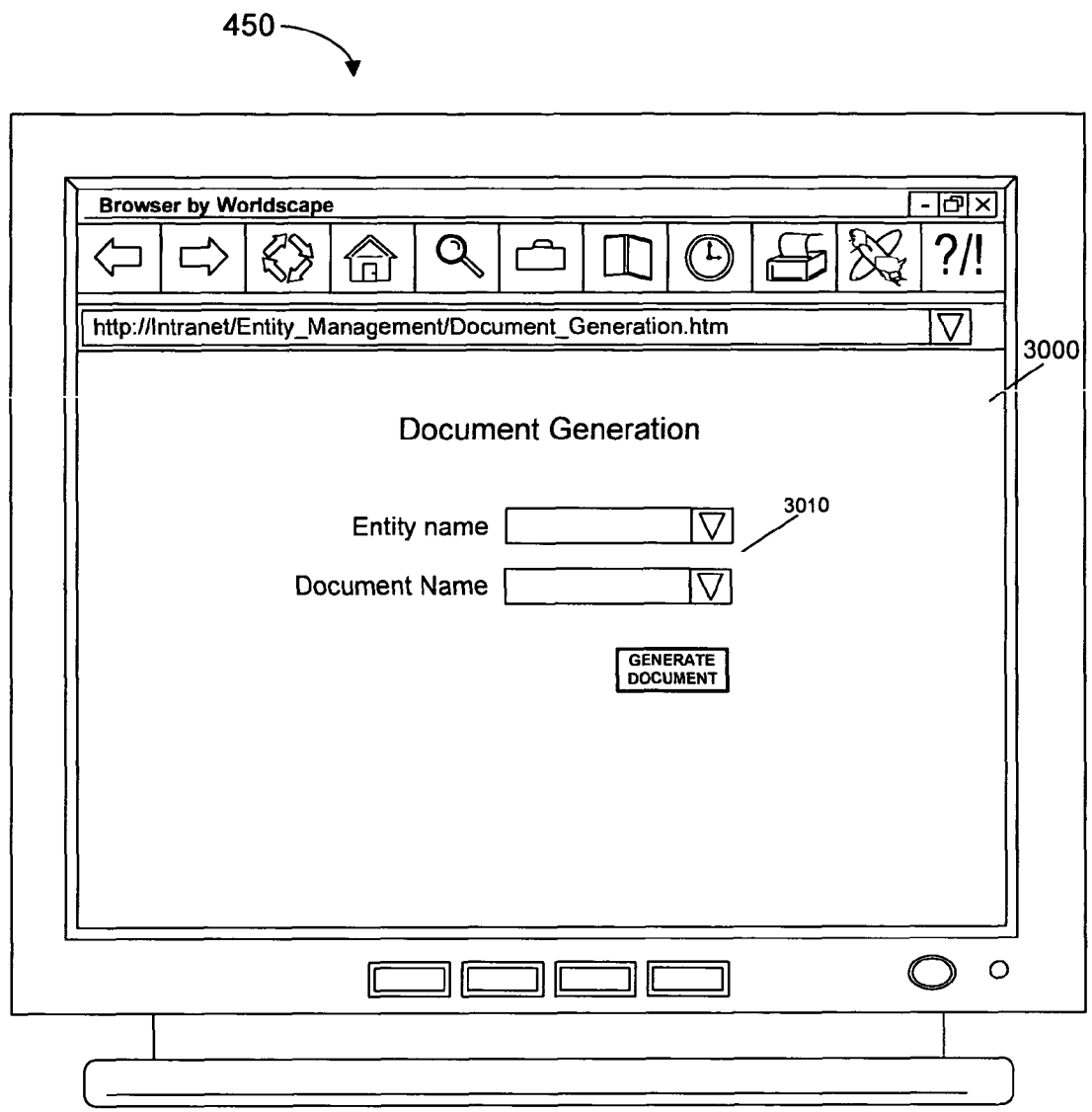
FIG. 30 is a representative view of an interface according to some embodiments of the present invention.

Interface 3000 of FIG. 30 is presented in response to user selection of the Document Generation option from menu 2910. Interface 3000 may be used to generate documents relating to one or more corporate entities. According to the illustrated embodiment, an entity and a document are selected using pull-down menus located in main area 3010. In this regard, the pull-down menus may be populated, respectively, by information stored in general database 284 and document generation database 294.

By virtue of one or more of the foregoing features, some embodiments of the present invention provide an efficient interface for management of information related to corporate entities. It should be noted that the user interfaces of FIGS. 17 through 30 may be considered a single user interface. Moreover, a user interface according to embodiments of the present invention may be arranged differently than as shown, with all or some of the features of user interfaces 1700 through 3000 located within one or more user interfaces.

One or more of the interfaces described herein may include areas that allow editing of the information presented therein. Editing may be allowed based on editing rights of a user to whom the interface is presented, with several editing authority levels being available. In some embodiments, such editing causes editing of corresponding information stored in one or more of databases 283 through 294. Also in some embodiments, edited information may be associated with information indicating who edited the information and a date on which the information was edited. Furthermore, an interface according to some embodiments of the invention may present indications to a user that information presented therein is in the process of being edited by another user.

As mentioned above, each of databases 283 through 294 may contain information other than that explicitly mentioned herein. Accordingly, each of interfaces 1700 through 3000 may also present information other than that described herein. In one example, one or more of the interfaces may include links selectable to cause presentation of an area presenting images of documents relating to the at least one corporate entity. In another example, officers database 289 and interface 2400 track outside directorships held by each presented officer. The databases and interfaces related to reporting requirements may also provide a filing calendar that may be searched or organized by factors such as due date, entity, responsible division, responsible person, and regulatory body.

In some embodiments, entity management server 200 may be integrated with other devices operated by an entity maintaining server 200. In addition, many of the embodiments described herein are directed to the financial services and securities-related entities. However, embodiments of the present invention are applicable to many types of entities that are related to many types of businesses.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A processor-implemented method comprising:
generating a user interface including a plurality of user selectable corporate entities and a user selectable corporate information category tab;
receiving a user selection of a corporate entity via the user interface;
retrieving via a processor, corporate information of corporate entity, wherein the corporate information includes at least ownership information, legal documents information and contact information relating to each corporate entity;
determining a plurality of corporate entities having ownership relationships with the user selected corporate entity based on the retrieved corporate information;
presenting a tiered selectable corporate ownership structure including the determined plurality of corporate entities showing ownership relationships and the user selectable corporate information category tab based on the retrieved corporate information,
wherein a first one of the plurality of corporate entities is at least a partial owner of a second one of the plurality of corporate entities and is graphically presented as being organizationally upstream from the second one of the plurality of corporate entities,
wherein a third one of the plurality of corporate entities is at least partial owned by a fourth one of the plurality of entities and is graphically presented as being organizationally downstream from the fourth one of the plurality of entities, and
wherein each of the plurality of corporate entities is shareholder-owned;

receiving a selection of the second corporate entity;
receiving a selection of the user selectable corporate information category tab;
retrieving a category of corporate information corresponding to the one selected corporate information category tab and relating to the selected second corporate entity based on the retrieved corporate information; and
presenting the retrieved information to a user.

2. A method according to claim 1, wherein the determined information comprises one or more of:
information relating to a formation of the second corporate entity;
a location of corporate documents relating to the second corporate entity;
contact information relating to the second corporate entity;
ownership information relating to the second corporate entity;
information relating to regulators of the second corporate entity;
information relating to officers of the second corporate entity;
information relating to jurisdictions in which the second corporate entity is qualified to do business;
information relating to reports filed or to be filed on behalf of the second corporate entity;
controllers information relating to the second corporate entity; and
funds information relating to the second corporate entity.

3. A method according to claim 1, further comprising:
receiving instructions to generate a document including document information relating to the selected second corporate entity;
determining the document information;
generating the document; and
presenting the document to the user.

4. A method according to claim 1, further comprising:
receiving instructions to edit the determined information;
determining whether the user is authorized to edit the determined information; and
editing the determined information if it is determined that the user is authorized to edit the determined information.

5. A method according to claim 4, further comprising: associating information identifying the user with the edited information.

6. A method according to claim 4, further comprising: presenting an indication that the determined information is in the process of being edited.

7. A method according to claim 1, further comprising:
associating information identifying a date on which the information was edited with the edited information.

8. A method according to claim 1, further comprising:
receiving a request for an image of a document relating to the selected second corporate entity; and
presenting the image to the user.

9. A computer-readable medium storing processor executable instructions comprising instructions to:
generate a user interface including a plurality of user selectable corporate entities and a user selectable corporate information category tab;
receive a user selection of a corporate entity via the user interface;
retrieve via a processor, corporate information of the user selected corporate entity, wherein the corporate information includes at least ownership information, legal documents information and contact information relating to each corporate entity;
determine a plurality of corporate entities having ownership relationships with the user selected corporate entity based on the retrieved corporate information;
present a tiered selectable corporate ownership structure including the determined plurality of corporate entities showing ownership relationships and the user selectable corporate information category tab based on the retrieved corporate information,
wherein a first one of the plurality of corporate entities is at least a partial owner of a second one of the plurality of corporate entities and is graphically presented as being organizationally upstream from the second one of the plurality of corporate entities,
wherein a third one of the plurality of corporate entities is at least partial owned by a fourth one of the plurality of entities and is graphically presented as being organizationally downstream from the fourth one of the plurality of entities, and
wherein each of the plurality of corporate entities is shareholder-owned;
receive a selection of the second corporate entity;
receive a selection of the user selectable corporate information category tab;
retrieve a category of corporate information corresponding to the one selected corporate information category tab and relating to the selected second corporate entity based on the retrieved corporate information; and
present the retrieved information to a user.

10. A computer-readable medium according to claim 9, wherein the determined information comprises one or more of:
information relating to a formation of the second corporate entity;
a location of corporate documents relating to the second corporate entity;
contact information relating to the second corporate entity;
ownership information relating to the second corporate entity;
information relating to regulators of the second corporate entity;
information relating to officers of the second corporate entity;
information relating to jurisdictions in which the second corporate entity is qualified to do business;
information relating to reports filed or to be filed on behalf of the second corporate entity;
controllers information relating to the second corporate entity; and
funds information relating to the second corporate entity.

11. A computer-readable medium according to claim 9, further comprising instructions to:
receive instructions to generate a document including document information relating to the second corporate entity;
determine the document information;
generate the document; and
present the document to the user.

12. A computer-readable medium according to claim 9, further comprising instructions to:
a step to receive instructions to edit the determined information;
a step to determine whether the user is authorized to edit the determined information; and
a step to edit the determined information if it is determined that the user is authorized to edit the determined information.

13. A computer-readable medium according to claim 12, further comprising instructions to:
associate information identifying the user with the edited information.

14. A computer-readable medium according to claim 12, further comprising instructions to:
present an indication that the determined information is in the process of being edited.

15. A computer-readable medium according to claim 9, the process steps further comprising instructions to:
associate information identifying a date on which the information was the edited information.

16. A computer-readable medium according to claim 9, the process steps further comprising instructions to:
receive a request for an image of a document relating to the second corporate entity; and
present the image to the user.

17. An apparatus to manage corporate entities, comprising:
a processor; and
a storage device in communication with said processor and storing instructions adapted to be executed by said processor to:
generate a user interface including a plurality of user selectable corporate entities and a user selectable corporate information category tab;
receive a user selection of a corporate entity via the user interface;
retrieve via a processor, corporate information of the user selected corporate entity, wherein the corporate information includes at least ownership information, legal documents information and contact information relating to each corporate entity;
determine a plurality of corporate entities having ownership relationships with the user selected corporate entity based on the retrieved corporate information;
present a tiered selectable corporate ownership structure including the determined plurality of corporate entities showing ownership relationships and the user selectable corporate information category tab based on the retrieved corporate information,
wherein a first one of the plurality of corporate entities is at least a partial owner of a second one of the plurality of corporate entities and is graphically presented as being organizationally upstream from the second one of the plurality of corporate entities,
wherein a third one of the plurality of corporate entities is at least partial owned by a fourth one of the plurality of entities and is graphically presented as being organizationally downstream from the fourth one of the plurality of entities, and
wherein each of the plurality of corporate entities is shareholder-owned;
receive a selection of the second corporate entity;
receive a selection of the user selectable corporate information category tab;
retrieve a category of corporate information corresponding to the one selected corporate information category tab and relating to the selected second corporate entity based on the retrieved corporate information; and
present the retrieved information to a user.

18. An apparatus according to claim 17, wherein the determined information comprises one or more of:
information relating to a formation of the second corporate entity;
a location of corporate documents relating to the second corporate entity;
contact information relating to the second corporate entity;
ownership information relating to the second corporate entity;
information relating to regulators of the second corporate entity;
information relating to officers of the second corporate entity;
information relating to jurisdictions in which the second corporate entity is qualified to do business;
information relating to reports filed or to be filed on behalf of the second corporate entity;
controllers information relating to the second corporate entity; and
funds information relating to the second corporate entity.

19. An apparatus according to claim 17, the instructions further adapted to be executed by said processor to:
receive instructions to generate a document including document information relating to the second corporate entity;
determine the document information;
generate the document; and
present the document to the user.

20. An apparatus according to claim 17, the instructions further adapted to be executed by said processor to:
receive instructions to edit the determined information;
determine whether the user is authorized to edit the determined information; and
edit the determined information if it is determined that the user is authorized to edit the determined information.

21. An apparatus according to claim 20, the instructions further adapted to be executed by said processor to:
associate information identifying the user with the edited information.

22. An apparatus according to claim 20, the instructions further adapted to be executed by said processor to:
present an indication that the determined information is in the process of being edited.

23. An apparatus according to claim 17, the instructions further adapted to be executed by said processor to:
receive a request for an image of a document relating to the second corporate entity; and
present the image to the user.

24. A processor-implemented method comprising:
generating a user interface including a plurality of user selectable corporate entities and a user selectable corporate information category tab;
receiving a user selection of a corporate entity via the user interface;
retrieving via a processor, corporate information of the user selected corporate entity, wherein the corporate information comprises one or more of:
information relating to a formation of the second corporate entity,
a location of corporate documents relating to the second corporate entity,
contact information relating to the second corporate entity,
ownership information relating to the second corporate entity,
information relating to regulators of the second corporate entity,
information relating to officers of the second corporate entity,
information relating to jurisdictions in which the second corporate entity is qualified to do business,
information relating to reports filed or to be filed on behalf of the second corporate entity,
controllers information relating to the second corporate entity, and funds information relating to the second corporate entity;

determining a plurality of corporate entities having ownership relationships with the user selected corporate entity based on the retrieved corporate information;

presenting a tiered selectable corporate ownership structure including the determined plurality of corporate entities showing ownership relationships and the user selectable corporate information category tab based on the retrieved corporate information, wherein a first one of the plurality of corporate entities is at least a partial owner of a second one of the plurality of corporate entities and is graphically presented as being organizationally upstream from the second one of the plurality of corporate entities, wherein a third one of the plurality of corporate entities is at least partial owned by a fourth one of the plurality of entities and is graphically presented as being organizationally downstream from the fourth one of the plurality of entities, and wherein each of the plurality of corporate entities is shareholder-owned;

receiving a selection of the second corporate entity;

receiving a selection of the user selectable corporate information category tab;

retrieving a category of corporate information corresponding to the one selected corporate information category tab and relating to the selected second corporate entity based on the retrieved corporate information; and presenting the retrieved information to a user.

\* \* \* \* \*